United States Patent
Kang

(10) Patent No.: US 12,025,714 B2
(45) Date of Patent: Jul. 2, 2024

(54) METHOD AND APPARATUS FOR DETERMINING LOCATION BY CORRECTING GLOBAL NAVIGATION SATELLITE SYSTEM BASED LOCATION AND ELECTRONIC DEVICE THEREOF

(71) Applicant: THINKWARE CORPORATION, Seongnam-si (KR)

(72) Inventor: Young Su Kang, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 579 days.

(21) Appl. No.: 17/113,931

(22) Filed: Dec. 7, 2020

(65) Prior Publication Data

US 2021/0173095 A1    Jun. 10, 2021

(30) Foreign Application Priority Data

Dec. 6, 2019 (KR) .................. 10-2019-0161917

(51) Int. Cl.
    *G01S 19/40*    (2010.01)
    *G01S 19/07*    (2010.01)
    (Continued)

(52) U.S. Cl.
CPC .............. *G01S 19/40* (2013.01); *G01S 19/07* (2013.01); *G01S 19/48* (2013.01); *G01S 19/485* (2020.05); *G01S 19/45* (2013.01); *G06F 18/22* (2023.01); *G06T 5/50* (2013.01); *G06T 7/70* (2017.01); *G06T 7/74* (2017.01); *G06T 2207/20221* (2013.01); *G06T 2207/30252* (2013.01);
(Continued)

(58) Field of Classification Search
CPC ........ G01S 19/07; G01S 19/40; G01S 19/485; G01S 19/48; G01S 19/45; G01S 19/41; G06T 7/74; G06T 7/70; G06T 5/50; G06V 10/82; G06V 10/764; G06V 20/10; G06V 20/56; G06F 18/22; H04N 23/90
USPC ............ 342/357.23, 357.24, 357.28, 357.31, 342/357.44

See application file for complete search history.

(56) References Cited

U.S. PATENT DOCUMENTS 9,965,699 B2 * 5/2018 Sorstedt ................. G06V 20/56
10,467,771 B2 * 11/2019 Stenborg ................. G06F 18/22
(Continued)

FOREIGN PATENT DOCUMENTS

| DE | 112020002175 T5 * | 6/2022 | ............ B60W 40/06 |
| EP | 4033208 A2 * | 7/2022 | ............ G01C 21/28 |
| WO | WO-2021076789 A1 * | 4/2021 | ............ B64C 39/024 |

*Primary Examiner* — Chuong P Nguyen
(74) *Attorney, Agent, or Firm* — Bridgeway IP Law Group, PLLC; Sang Ho Lee; Hyun Woo Shin

(57) ABSTRACT

The present disclosure relates to a location measurement method using a processor. The location measurement method includes: acquiring a surrounding image photographed by an electronic device; acquiring first location information of the electronic device using a global navigation satellite system; and acquiring second location information obtained by correcting the first location information using the surrounding image photographed by the electronic device, in which a correction value for correction from the first location information to the second location information is calculated by detection of an image including a static object included in the photographed surrounding image from a pre-stored real-world image map.

18 Claims, 15 Drawing Sheets

(51) Int. Cl.
  *G01S 19/48* (2010.01)
  *G01S 19/45* (2010.01)
  *G06F 18/22* (2023.01)
  *G06T 5/50* (2006.01)
  *G06T 7/70* (2017.01)
  *G06T 7/73* (2017.01)
  *G06V 10/764* (2022.01)
  *G06V 10/82* (2022.01)
  *G06V 20/10* (2022.01)
  *G06V 20/56* (2022.01)
  *H04N 23/90* (2023.01)

(52) U.S. Cl.
  CPC ............ *G06V 10/764* (2022.01); *G06V 10/82* (2022.01); *G06V 20/10* (2022.01); *G06V 20/56* (2022.01); *H04N 23/90* (2023.01)

(56) References Cited

U.S. PATENT DOCUMENTS

| | | | |
|---|---|---|---|
| 11,024,055 B2* | 6/2021 | Hsu | G06T 7/75 |
| 11,255,979 B2* | 2/2022 | Kwon | G06V 20/582 |
| 11,288,860 B2* | 3/2022 | Abe | G06T 17/05 |
| 11,341,742 B2* | 5/2022 | Sohn | G01S 5/0284 |
| 2018/0204347 A1* | 7/2018 | Stenborg | G06F 18/22 |
| 2020/0124421 A1* | 4/2020 | Kang | G01S 17/06 |
| 2020/0240790 A1* | 7/2020 | Behrendt | G01S 13/865 |
| 2020/0311966 A1* | 10/2020 | Nakata | G06V 10/764 |
| 2021/0183094 A1* | 6/2021 | Son | G06F 18/24147 |
| 2022/0058428 A1* | 2/2022 | Matsunaga | G06V 10/764 |
| 2022/0164982 A1* | 5/2022 | Lin | G06T 7/579 |

\* cited by examiner

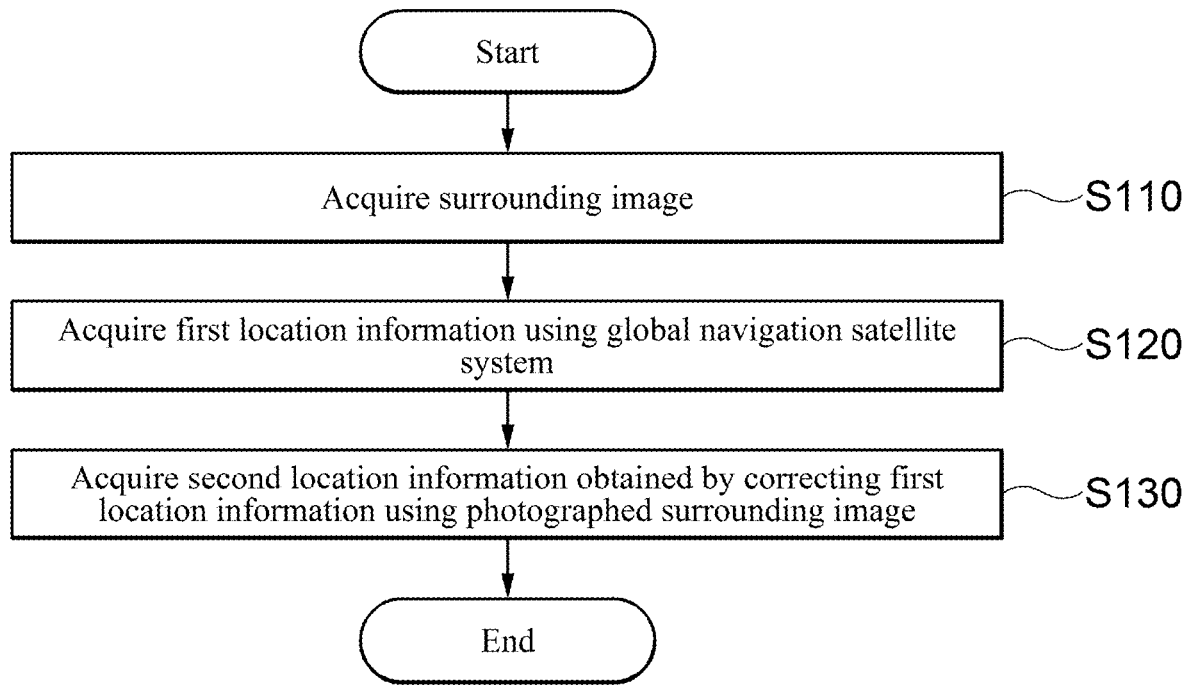

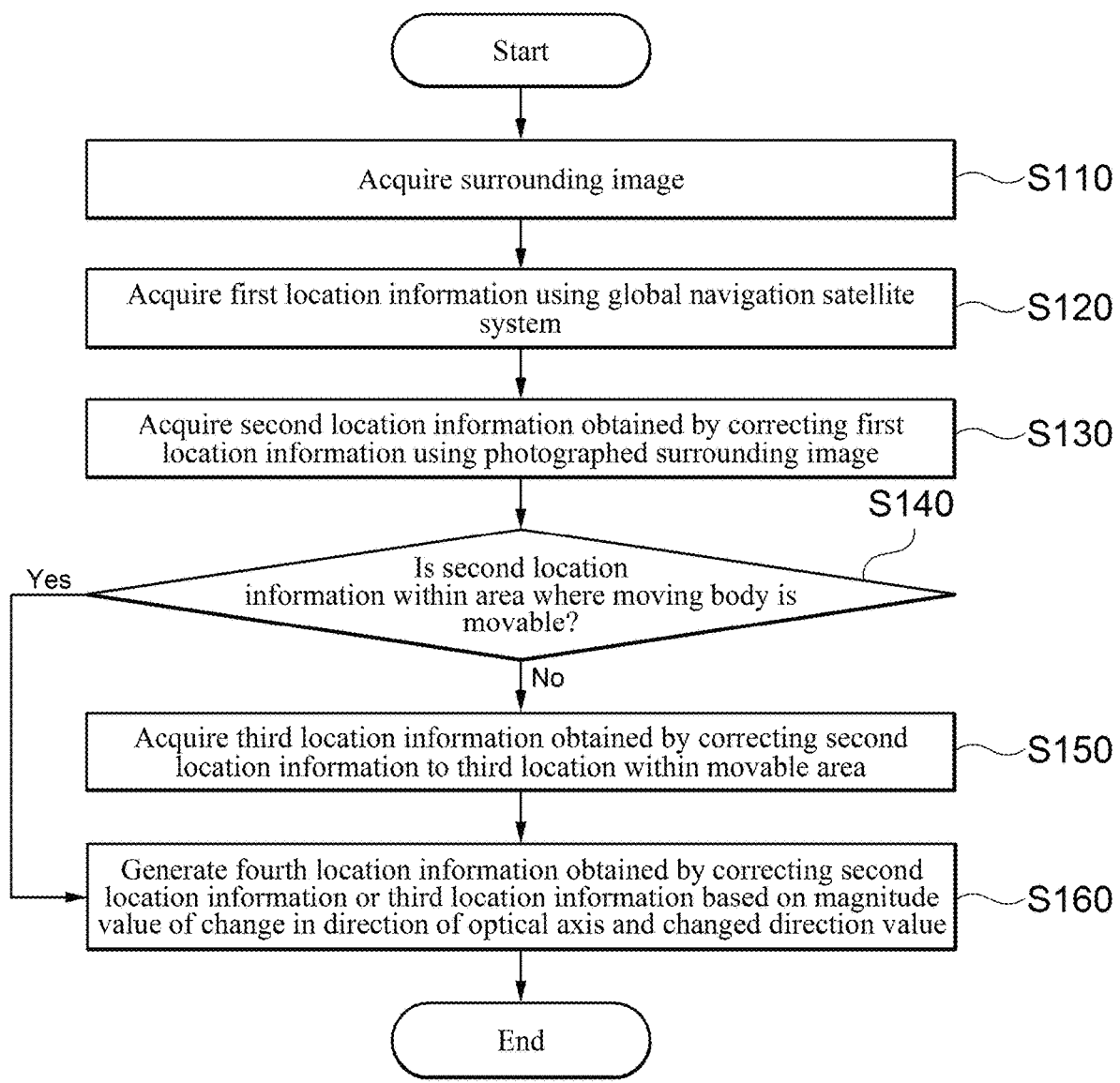

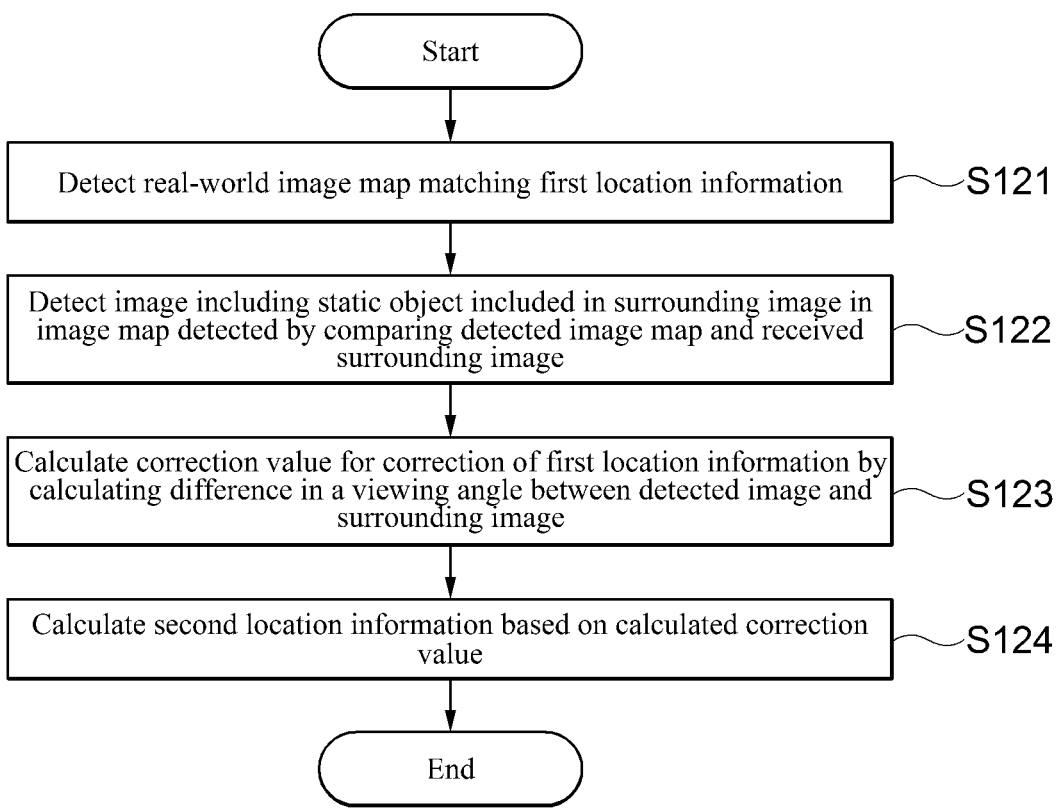

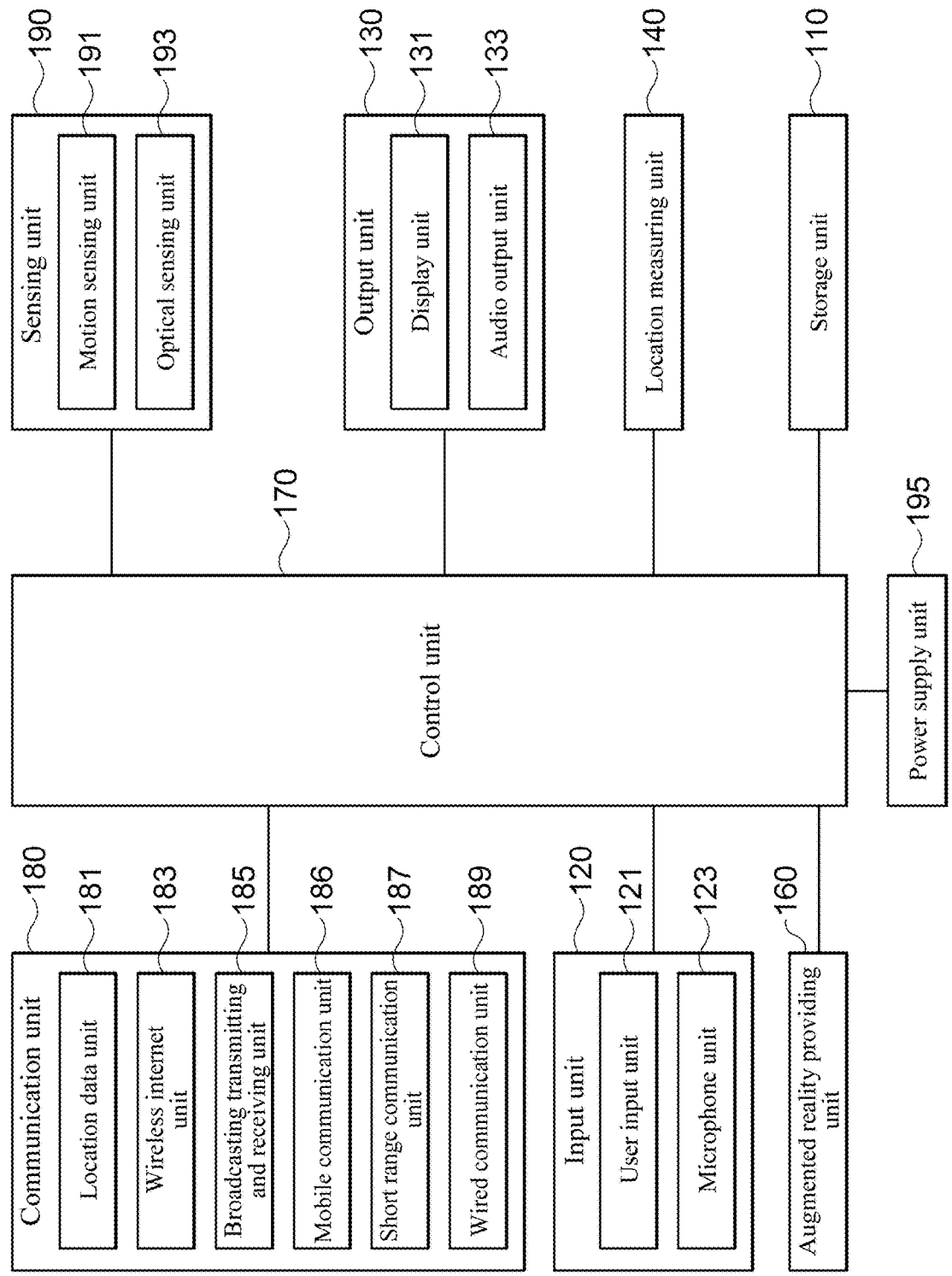

METHOD AND APPARATUS FOR DETERMINING LOCATION BY CORRECTING GLOBAL NAVIGATION SATELLITE SYSTEM BASED LOCATION AND ELECTRONIC DEVICE THEREOF

CROSS-REFERENCE TO RELATED APPLICATION

This application claims the priority and benefit of Korean Patent Application No. 10-2019-0161917 filed on Dec. 6, 2019, with the Korean Intellectual Property Office, the disclosure of which is incorporated herein by reference.

BACKGROUND OF THE INVENTION

Field of the Invention

The present disclosure relates to a location measurement method and a location measurement apparatus by correcting a global navigation satellite system based location and an electronic device thereof.

Description of the Related Art

As the Internet network is opened and laws related to location data are reorganized, the industry related to location based service (LBS) is being activated.

As a representative device using such a location based service, there is a vehicle navigation system that locates a current location of a vehicle or like, or guides a moving route to a destination.

In addition, recently, a vehicle black box that can provide objective data has been used to determine the percentage of negligence according to the responsibility of an accident that occurred while the vehicle is stopped or traveling, and as the performance improves, location based services are also being provided through vehicle black boxes.

In addition, recently, the location based service is expanding to pedestrians, and a pedestrian navigation service that guides a person's current location and movement route to a destination through a smartphone is also provided.

As such, the location based services are closely applied to people's real life and are widely used in many fields.

In order to provide such location based services smoothly, it is very important to determine the exact location of a positioning target such as a person or a vehicle. To this end, various techniques have been proposed in the prior art.

SUMMARY OF THE INVENTION

The present disclosure provides a location measurement method and a location measurement apparatus by calculating correction location information obtained by correcting first location information acquired using a global navigation satellite system based on at least one of surrounding image data photographed by an electronic device, movable area data of a moving object, and change data in an optical axis direction of a camera.

The present disclosure provides an electronic device that provides location based guide using calculated correction location information.

According to the present disclosure, a location measurement method using a processor includes: acquiring a surrounding image photographed by an electronic device; acquiring first location information of the electronic device using a global navigation satellite system; and acquiring second location information obtained by correcting the first location information using the surrounding image photographed by the electronic device, in which a correction value for correction from the first location information to the second location information is calculated by detection of an image including a static object included in the photographed surrounding image from a pre-stored real-world image map.

The location measurement method may further include: generating a combined image in which a front image and a rear image are combined in consideration of an angle of view of the camera, in which the acquired surrounding image includes the front image photographed by a first camera and the rear image photographed by a second camera, and in the acquiring of the second location information, the second location information obtained by correcting the first location information using the combined image may be acquired.

The location measurement method may further include: generating an image including only the static object, excluding dynamic objects from the acquired surrounding image, in which in the acquiring of the second location information, the second location information obtained by correcting the first location information using the generated image may be acquired.

The acquiring of the second location information may include transmitting the photographed surrounding image and the first location information to an image analysis server, and the image analysis server may detect a real-world image map matching the received first location information, compare the detected image map with the received surrounding image to detect the image including the static object included in the surrounding image from the detected image map, calculate a difference in viewing angles between the detected image and the surrounding image and a difference between the location information matching the detected image and the first location information to calculate a correction value for the correction of the first location information, and calculates the second location information based on the calculated correction value.

The location measurement method may further include: determining whether the second location information is a location within an area where a moving object is movable.

The location measurement method may further include acquiring third location information obtained by correcting the second location information to a third location within the movable area when the second location information is not the location within the area where the moving object is movable.

The location measurement method may further include determining the second location information as the location of the moving object when the second location information is the location within the area where the moving object is movable.

In the acquiring of the third location information, the third location information may be acquired by laterally moving the second location information to be matched within the movable area.

The determining may include determining a type of the moving object and determining the movable area according to the determined type of the moving type.

The location measurement method may further include: generating fourth location information by correcting the second location information or the third location information based on a magnitude value of the change in the optical axis direction and a changed direction value, when the change in the optical axis direction to which the optical axis of the camera is directed is detected while the moving object is moving.

According to the present disclosure, a location measurement apparatus includes: an image acquisition unit that acquires a surrounding image photographed by an electronic device; a first location information acquisition unit that acquires first location information of the electronic device using a global navigation satellite system; and a second location information acquisition unit that acquires second location information obtained by correcting the first location information using a vehicle traveling image photographed by the electronic device, in which a correction value for correction from the first location information to the second location information is calculated by detection of an image including a static object included in the photographed surrounding image from a pre-stored real-world image map.

The location measurement apparatus may further include: an image processing unit that combines the front image and the rear image in consideration of an angle of view of a camera, in which the acquired surrounding image may include a front image photographed by a first camera and a rear image photographed by a second camera, and the second location information acquisition unit may acquire the second location information obtained by correcting the first location information using the combined image.

The location measurement apparatus may further include: an image processing unit that generates an image including only the static object, excluding dynamic objects from the acquired surrounding image, in which the second location information acquisition unit may acquire the second location information obtained by correcting the first location information using the generated image.

The location measurement apparatus may further include: a communication unit that transmits the photographed surrounding image and the first location information to an image analysis server, in which the image analysis server may detect a real-world image map matching the received first location information, compare the detected image map with the received surrounding image to detect the image including the static object included in the surrounding image from the detected image map, calculate a difference in viewing angles between the detected image and the surrounding image and a difference between the location information matching the detected image and the first location information to calculate a correction value for the correction of the first location information, and calculate the second location information based on the calculated correction value.

The location measurement apparatus may further include: a third location information acquisition unit that determines whether the second location information is a location within an area where a moving object is movable.

The third location information acquisition unit may acquire third location information obtained by correcting the second location information to a third location within the movable area when the second location information is not a location within the area where the moving object is movable.

The third location information acquisition unit may determine the second location information as the location of the moving object when the second location information is a location within the area where the moving object is movable.

The third location information acquisition unit may acquire the third location information by laterally moving the second location information to be matched within the movable area.

The third location information acquisition unit may determine a type of the moving object and determines the movable area according to the determined type of the moving object.

The location measurement apparatus may further include: a fourth location information acquisition unit that generates fourth location information by correcting the second location information or the third location information based on a magnitude value of the change in the optical axis direction and a direction value, when the change in the optical axis direction to which the optical axis of the camera is directed is detected while the moving object is moving.

According to the present disclosure, a method for providing location based guide service using an electronic device includes: acquiring a surrounding image photographed by an electronic device; acquiring first location information of the electronic device using a global navigation satellite system; acquiring second location information obtained by correcting the first location information using the surrounding image photographed by the electronic device; and providing a location based guide based on the second location information, in which a correction value for correction from the first location information to the second location information may be calculated by detection of an image including a static object included in the photographed surrounding image from a pre-stored real-world image map.

The method for providing location based guide service may further include: determining whether the second location information is a location within an area where a moving object is movable; and acquiring third location information obtained by correcting the second location information to a third location within the movable area, when the second location information is not the location within the area where the moving object is movable.

The second location information may be determined as a location of the moving object when the second location information is a location within the area where the moving object is movable.

The providing of the location based guide may include generating the location based guide object based on the second location information or the third location information, and displaying the generated guide object on augmented reality.

The providing of the location based guide may include: generating a mini-map that detects map data and displays an identifier indicating the second location information or the third location information in the detected map data; and displaying the generated mini-map and the photographed image together.

According to the present disclosure, an electronic device includes: an image acquisition unit that acquires a surrounding image photographed by the electronic device; a first location information acquisition unit that acquires first location information of the electronic device using a global navigation satellite system; a second location information acquisition unit that acquires second location information obtained by correcting the first location information using a vehicle surrounding image photographed by the electronic device; and a control unit that provides a location based guide based on the second location information, in which a correction value for correction from the first location information to the second location information may be calculated by detection of an image including a static object included in the photographed surrounding image from a pre-stored real-world image map.

The electronic device may further include: a third location information acquisition unit that determines whether the second location information is a location within an area where a moving object is movable and acquires third location information obtained by correcting the second location information to a third location within a movable area, when and the second location information is not a location within the area where the moving object is movable.

The second location information may be determined as the location of the moving object when the second location information is a location within the area where the moving object is movable.

The control unit may control a display unit to generate the location based guide object based on the second location information or the third location information, and display the generated guide object on augmented reality.

The electronic device may further include: a mini-map generation unit that generates a mini-map detecting map data and displaying an identifier indicating the second location information or the third location information in the detected map data, in which the control unit may control a display unit to display the generated mini-map and the photographed image together.

There is provided a program recorded in a storage medium to execute the location measurement method according to one embodiment of the present disclosure to achieve the above object.

There is provided a computer-readable recording medium in which a program code for executing the location measurement method according to one embodiment of the present disclosure to achieve the above object.

Technical solutions of the present disclosure are not limited to the abovementioned solutions, and solutions that are not mentioned will be clearly understood by those skilled in the art to which the present disclosure pertains from the present specification and the accompanying drawings.

According to various embodiments of the present disclosure described above, it is possible to measure the accurate location of the moving object by calculating the correction location information obtained by correcting the first location information acquired using the global navigation satellite system based on at least one of the surrounding image data photographed by the electronic device, the movable area data of the moving object, and the change data in the optical axis direction of the camera.

Accordingly, according to the present disclosure, it is possible to increase the movement convenience of the pedestrian or the vehicle driver by providing the pedestrian or vehicle driver with the route guidance service or the mini-map service based on the exact location to allow the pedestrian or the vehicle driver to accurately recognize his/her current location and to smoothly move to the destination.

BRIEF DESCRIPTION OF THE DRAWING FIGURES

FIG. 7 is a flowchart illustrating a location measurement method according to an embodiment of the present disclosure.

FIG. 8 is a flowchart illustrating in more detail the location measurement method according to the embodiment of the present disclosure.

FIG. 9 is a flowchart illustrating in more detail a process of extracting second location information using image analysis according to an embodiment of the present disclosure.

FIG. 10 is a block diagram illustrating an electronic device according to an embodiment of the present disclosure.

DETAILED DESCRIPTION OF THE EXEMPLARY EMBODIMENTS

Figure 1:
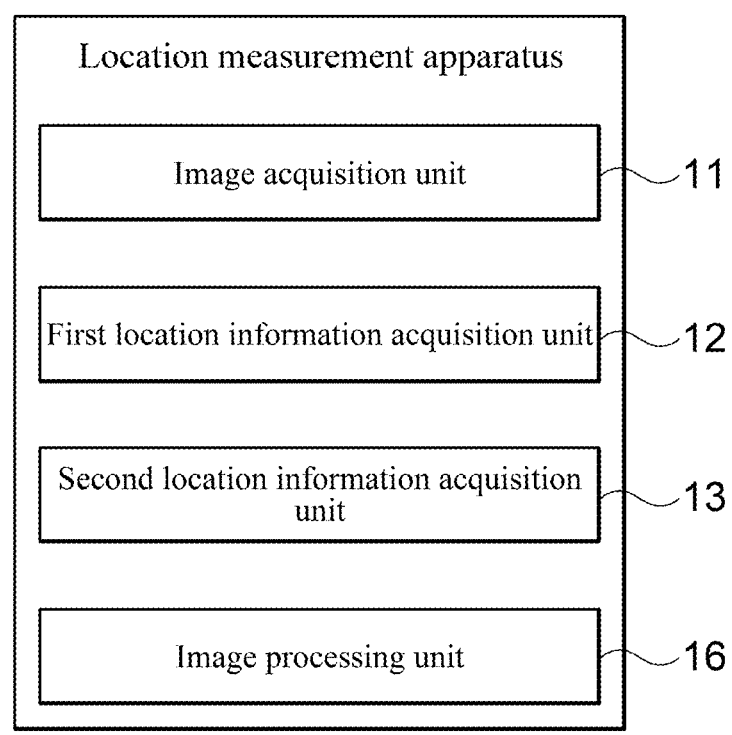
FIG. 1 is a block diagram illustrating a location measurement apparatus according to an embodiment of the present disclosure.

The following content merely illustrates the principle of the present disclosure. Therefore, those skilled in the art may implement the principle of the present disclosure and invent various devices included in the spirit and scope of the present disclosure although not clearly described or shown in the present specification. In addition, it is to be understood that all conditional terms and embodiments mentioned in the present specification are obviously intended only to allow those skilled in the art to understand a concept of the present disclosure in principle, and the present disclosure is not limited to embodiments and states particularly mentioned as such.

Further, it is to be understood that all detailed descriptions mentioning specific embodiments of the present disclosure as well as principles, aspects, and embodiments of the present disclosure are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, block diagrams of the present specification illustrate a conceptual aspect of an illustrative circuit for embodying a principle of the present disclosure. Therefore, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute software in connection with appropriate software as well as dedicated hardware. When the functions are provided by the processors, they may be provided by a single dedicated processor, a single shared processor, or a plurality of individual processors, and some of them may be shared with each other.

In addition, the explicit use of terms presented as the processor, control, or similar concepts should not be interpreted exclusively by quoting hardware capable of executing software, but should be understood to implicitly include, without limitation, digital signal processor (DSP) hardware, a ROM for storing software, a RAM, and a non-volatile memory. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a method demanded by the claims in the present disclosure defined by the claims, any means capable of providing these functions are equivalent to means recognized from the present specification.

The above-mentioned objects, features, and advantages will become more obvious from the following detailed description associated with the accompanying drawings. Therefore, those skilled in the art to which the present disclosure pertains may easily practice a technical idea of the present disclosure. In describing the present disclosure, if it is determined that a detailed description of the known technology or configuration related to the present disclosure may unnecessarily obscure the subject matter of the present disclosure, the detailed description thereof will be omitted.

Hereinafter, various embodiments of the present disclosure will be described in detail with reference to the accompanying drawings.

Figure 2:
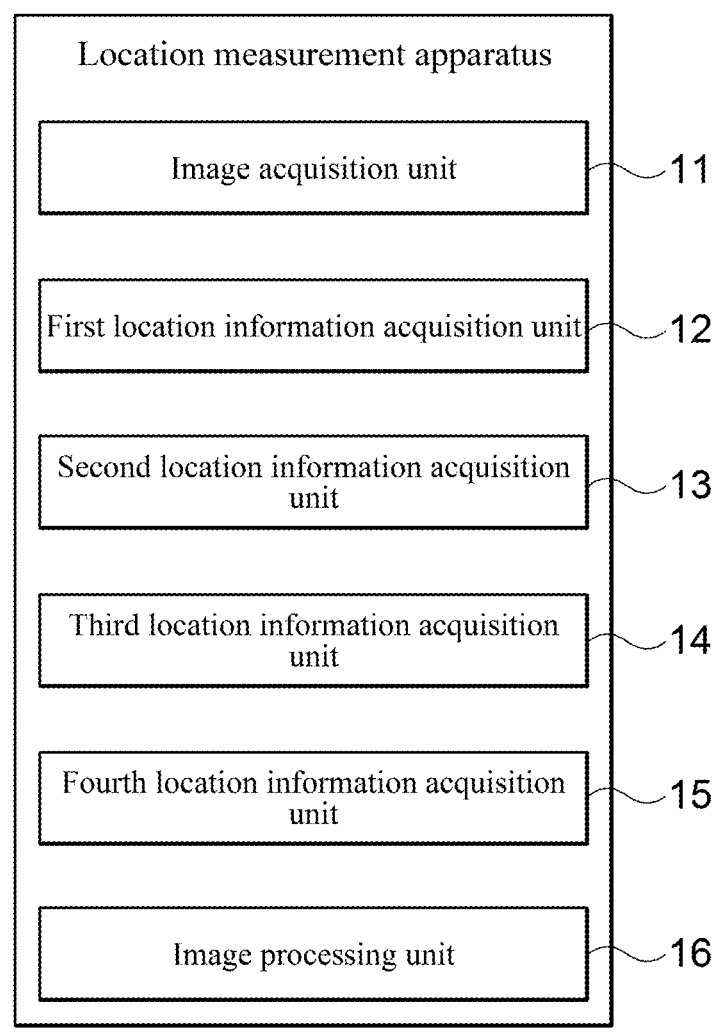
FIG. 2 is a block diagram illustrating in more detail the location measurement apparatus according to the embodiment of the present disclosure.

FIG. 1 is a block diagram illustrating a location measurement apparatus according to an embodiment of the present disclosure. FIG. 2 is a block diagram illustrating in more detail the location measurement apparatus according to the embodiment of the present disclosure.

Referring to FIGS. 1 to 2, a location measurement apparatus 10 may include a part or all of an image acquisition unit 11, a first location information acquisition unit 12, a second location information acquisition unit 13, a third location information acquisition unit 14, a fourth location information acquisition unit 15, and an image processing unit 16.

The location measurement device 10 may acquire a peripheral image captured by an electronic device, and calculate correction location information obtained by correcting first location information acquired by using a global navigation satellite system based on at least one of peripheral image data captured by an electronic device, movable area data of a moving object, and change data in an optical axis direction of a camera.

Here, the location measurement apparatus 10 may be implemented using software, hardware, or a combination thereof. As an example, according to a hardware implementation, the location measurement apparatus 10 may be implemented using application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and at least one of electric units for performing other functions.

The moving object is an object that is movable and needs to be located, and may include a living body such as a person or dog that can move using its own body, and a transporter that can move the living body using power. Here, the transporter may include a vehicle, a ship, an airplane, and the like, and the vehicle may be a concept including all transport machinery such as a railroad vehicle traveling on a track and a car traveling on a lane, a motorcycle, a bicycle, and the like.

Hereinafter, for convenience of explanation, each constituent modules constituting the location measurement apparatus 10 will be described in more detail with reference to, as an example, a case where a moving object is implemented as a person and a vehicle.

The image acquisition unit 11 may acquire the surrounding image photographed by the camera of the electronic device while the moving object is moving.

For example, when the moving object is a person, the image acquisition unit 11 may acquire, in real time, the surrounding image photographed by the electronic device such as a smartphone carried by the person while the person is moving.

As another example, when the moving object is a vehicle, the image acquisition unit 11 may acquire, in real time, the surrounding image photographed by the electronic device such as an image photographing apparatus for a vehicle installed in the vehicle while the vehicle is moving.

Here, the photographed surrounding image includes numerous objects, such as vehicles, people, animals, bridges, buildings, roadways, sidewalks, roadway guide signs, crosswalks, intersections, traffic lights, medians, bus stops, and trees, located in the real-world environment where the moving object moves.

As an example, the photographed image of the roadway may include a plurality of lanes distinguished along lane marking, a roadway composed of a plurality of lanes, and a plurality of vehicles traveling on the roadway. In addition, the traveling image acquired according to the roadway on which the vehicle is traveling may include a roadway guide sign. Here, the lane marking may mean each of both side lines forming a lane in which the vehicle is located. Further, a lane is formed by lane marking such as one lane, two-lane, . . . , or N-lane, and may mean a roadway on which a vehicle travels.

An object according to the present disclosure may be classified into a static object and a dynamic object.

The static object may mean an object whose location, shape, and the like do not change or are very unlikely to change in the real-world environment. That is, when a specific area of the real-world environment is photographed during a specific time period, the static object may be an object included in all or almost all of the images photographed during the specific time period.

In addition, the dynamic object may mean an object having a high possibility of changing a location, shape, and the like in the real-world environment. That is, when a specific area of the real-world environment is photographed during a specific time period, the dynamic object may be an object included only in a part of images and not included in the rest of the images that are photographed during the specific time period.

According to the present disclosure, among various objects included in the photographed surrounding image, objects such as vehicles, people, and animals may be classified as dynamic objects. Among various objects included in the photographed surrounding image, fixed facilities such as buildings, bridges, roadways, and sidewalks may be classified as static objects.

Meanwhile, the first location information acquisition unit 12 may acquire first location information of an electronic device using a global navigation satellite system. Here, the global navigation satellite system is a device that acquires location data through a global navigation satellite system (GNSS), and the GNSS means a navigation system capable of calculating a location of a receiving terminal using a radio signal received from an artificial satellite. As a detailed example of the GNSS may include a global positioning system (GPS), a Galileo system, a global orbiting navigational satellite system (GLONASS), a COMPASS, an Indian regional navigational satellite system (IRNSS), a quasi-zenith satellite system (QZSS), and the like, depending on an operating subject of the GNSS. The first location information acquisition unit 12 according to the embodiment of the present disclosure may acquire location data by receiving a GNSS signal serving in an area where the location measurement apparatus 10 is used. Alternatively, the first location information acquisition unit 12 may obtain location data through communication with a base station or an access point (AP) in addition to the GNSS.

The second location information acquisition unit 13 may acquire second location information obtained by correcting the first location information using the photographed surrounding image. Specifically, the second location information acquisition unit 13 may acquire the second location information obtained by correcting the first location information using the surrounding image acquired through the image acquisition unit 11. Here, the correction value for correction from the first location information to the second location information may be a value calculated through detection of an image including a static object included in a traveling image photographed from a pre-stored real-world image map.

To this end, the second location information acquisition unit 13 may perform image preprocessing for performing the second location information acquisition process in connection with the image processing unit 16.

Specifically, the surrounding image acquired by the image acquisition unit 11 may include a front image photographed by a first camera and a rear image photographed by a second camera. In this case, the image processing unit 16 may combine the front image and the rear image in consideration of the angle of view of the camera, and the second location information acquisition unit 13 may acquire the second location information obtained by correcting the first location information acquired by the first location information acquisition unit 12 using the generated combined image.

As an example, when all the directions may not be covered by the angle of view of the first camera and the angle of view of the second camera, the image processing unit 16 may generate an interpolated image for interpolation of the remaining portions not covered by the angles of view of the first and second cameras and generate a combined image in which the generated interpolated image and the front image and the rear image acquired by the image acquisition unit 11 are combined. Here, the image processing unit 16 may calculate a difference in the angles of view between the front image and the rear image, calculate a difference in pixel values between an edge of the front image and an edge of the rear image, and generate the interpolated image such that the pixels of the front image and the rear image are uniformly changed based on the calculated difference in angles of view and the calculated difference in pixels. In addition, the image processing unit 16 may combine the generated interpolated image between the front image and the rear image to generate a final combined image.

However, this is only an embodiment of the present disclosure, and according to another embodiment of the present disclosure, even when all the directions may not be covered by the angle of view of the first camera and the angle of view of the second camera, the image processing unit 16 may generate the combined image in which the front image and the rear image are combined without generating the interpolated image.

In addition, both the dynamic object and the static object may be included in the surrounding image acquired through the image acquisition unit 11. In this case, the image processing unit 16 may generate an image including only the static object, excluding the dynamic object from the acquired surrounding image.

For example, the image processing unit 16 may store dynamic object templates for fixed facilities such as buildings, bridges, roadways, and sidewalks, and static object templates such as vehicles, people, and animals, and may detect the dynamic object and the static object from the surrounding image by the matching of the pre-stored dynamic object template and static object template with the surrounding image acquired through the image acquisition unit 11.

As another example, the image processing unit 16 may detect the dynamic object and the static object from the surrounding image acquired through the image acquisition unit 11 using an artificial neural network. Specifically, the image processing unit 16 may collect a positive training image dataset for dynamic object for fixed facilities such as buildings, bridges, roadways, and sidewalks, and a positive training image dataset for static object such as vehicles, people and animals. In addition, the image processing unit 16 may also collect a negative training image dataset for dynamic object and a negative training image dataset for static object. In addition, the image processing unit 16 may perform deep learning on the positive training image dataset and the negative training image dataset to build a dynamic object/static object extraction model through the learning. As the deep learning, a convolution neural network (CNN) algorithm, which is one of neural network models, may be applied. In this case, the deep learning may perform learning through augmented data by assuming various conditions of a dynamic object image and a static object image. Here, the condition defines a condition for converting an image collected as training data to generate data for training a neural network model. Specifically, since various aspects can be exhibited by factors such as shift, rotation, brightness change, and blur of the image, data may be augmented in consideration of various aspects.

Accordingly, when the surrounding image is acquired by the image acquisition unit 11, the image processing unit 16 may detect the dynamic object and the static object from the surrounding image through the trained dynamic object/static object extraction model.

As another example, the image processing unit 16 may perform transparency processing and matching of a plurality of surrounding images acquired through the image acquisition unit 11, and detect the dynamic object and the static object from the matched surrounding images. Specifically, under the assumption that N surrounding images are matched, when it is assumed that transparency of an image that has not been subjected to the transparency processing is '1', the transparency processing may be performed by multiplying pixel values of each image to be transparent by 1/N. In addition, if N images that are transparent as described above are matched, static objects existing in each image remains on the matched image, but the dynamic objects disappear. In other words, if each image is transparent and then matched, since the pixels corresponding to the static objects in each image is applied with transparency multiplied by the same constant, each pixel value is added, and thus becomes equal to or close to the original pixel value and remains in the matched image. In this case, the image processing unit 16 may calculate standard deviations of pixel values of the matched image and pixel values of a plurality of surrounding images for each pixel, and determine pixels having a value within a preset threshold value among the calculated standard deviations as pixels constituting the static object according to the embodiment of the present disclosure. On the other hand, pixels having a value exceeding the preset threshold value among the calculated standard deviations may be determined as the pixels constituting the dynamic object according to the embodiment of the present disclosure. In this way, the image processing unit 16 may distinguish between the static object and the dynamic object from the matched image by calculating the standard deviations of the pixel values of each image and the pixel values of the matched image.

Meanwhile, according to the above-described process, when the dynamic object and the static object are detected in the surrounding image acquired through the image acquisition unit 11, the image processing unit 16 may generate an image including only the static object, excluding the dynamic object from the acquired surrounding image.

On the other hand, when the pre-processing of the image is completed, the second location information acquisition unit 13 may acquire the second location information through the communication with the image analysis server (not illustrated) that is building a real-world image map database. Here, the real-world image map may store a real-world image representing the real world as an image and the location information matched with the corresponding image.

For example, the second location information acquisition unit 13 may transmit the surrounding image acquired through the image acquisition unit 11 and the detailed information on the surrounding image to the image analysis server. Here, the detailed information on the surrounding image may include global navigation satellite system based first location information indicating a location at which the surrounding image is photographed, information on the time when the surrounding image is photographed, information on the camera specification, and the like.

In this case, the image analysis server may detect the real-world image map matching the received first location information among real-world image maps stored in the database. In addition, the image analysis server may compare the detected real-world image map with the received surrounding image to detect the image including the static object of the surrounding image from the detected real-world image map. In addition, the image analysis server may detect the location information matched with the detected image. Specifically, the image analysis server may detect, from the database, an object that matches the feature information on the object in the surrounding image received from the electronic device among the feature information on the objects stored in the real-world image map stored in the database. In addition, the image analysis server may transmit the location information matched with the detected object to the electronic device.

In addition, the image analysis server may calculate the difference in viewing angles between the detected image and the surrounding image and the difference between the location information of the detected image and the first location information to calculate the correction value for the correction of the first location information, and may calculate the second location information based on the calculated correction value. Here, the viewing angle may mean a direction to which the optical axis of the camera photographing the subject is directed. Even if the same subject is photographed, if the viewing angle when the subject is photographed is different, the subject may be expressed differently in the photographed image. Therefore, according to an embodiment of the present disclosure, the image analysis server may generate a first correction value by calculating the difference between the location information of the detected image and the first location information, generate a second correction value by calculating the difference in the viewing angles between the detected image and the surrounding image, calculate the correction value for the correction of the first location information by integrating the generated first correction value and second correction value, and calculate the second location information based on the calculated correction value. Here, the location information and the correction value may be composed of an x coordinate value, a y coordinate value, and a z coordinate value.

Meanwhile, according to the above example, it has been described as an example that all image analysis processes are performed in the image analysis server, but the present disclosure is not limited thereto. According to another implementation example of the present disclosure, at least one of a step of detecting a real-world image map matching the received first location information among the real-world image maps, a step of detecting an image including a static object included in the surrounding image in the detected image map by comparing the detected image map with the received surrounding image, a step of calculating the correction value for the correction of the first location information by calculating the difference in the viewing angles between the detected image and the surrounding image, an a step of calculating the second location information based on the calculated correction value may be performed by the location measurement apparatus 10, and the remaining steps may be performed by the image analysis servers.

Meanwhile, the third location information acquisition unit 14 may determine whether the second location information acquired through the second location information acquisition unit 13 is a location within the area where the movable object is movable according to the type of the moving object. The third location information acquisition unit 14 may acquire the third location information obtained by correcting the second location information to the third location within the movable area when the second location information is not a location within the area where the moving object is movable.

Specifically, the third location information acquisition unit 14 may determine the type of the moving object and determine the movable area according to the type of the moving object.

For example, when the type of the moving object is a person, the movable area of the moving object may be set as a road, and the non-movable area of the moving object may be set as a roadway. As another example, when the type of the moving object is a vehicle, the movable area of the moving object may be set as a roadway, and the non-movable area of the moving object may be set as a sidewalk. That is, the movable area of the moving object according to the present disclosure may vary according to the type of the moving object.

As described above, the third location information acquisition unit 14 may determine the type of the moving object equipped with the location measurement apparatus 10, and determine the movable area of the moving object according to whether the type of the moving object is a person or a vehicle.

Meanwhile, when the movable area of the moving object is determined, the third location information acquisition unit 14 may determine whether the second location information acquired through the second location information acquisition unit 13 is a location within the area where the movable object is movable. As an example, when the movable area of the moving object is a sidewalk, and the second location information acquired through the second location information acquisition unit 13 is a roadway, the third location information acquisition unit 14 may determine that the second location information is a location within the area where the moving object is not movable. As another example, when the movable area of the moving object is a roadway, and the second location information acquired through the second location information acquisition unit 13 is a sidewalk, the third location information acquisition unit 14 may determine that the second location information is a location within the area where the moving object is not movable.

When the second location information is not a location within the area where the moving object is movable, the third location information acquisition unit 14 may acquire the third location information obtained by correcting the second location information to the third location within the movable area. For example, when the second location information is not a location within the area where the moving object is movable, the third location information acquisition unit 14 may obtain the third location information by laterally moving the second location information acquired through the second location information acquisition unit 13 to be matched within the movable area.

However, when the second location information is a location within the area where the moving object is movable, the third location information acquisition unit 14 may determine the second location information as the location of the moving object without correcting the second location information.

Meanwhile, the fourth location information acquisition unit 15 may generate fourth location information by correcting the second location information or the third location information based on the magnitude value of the change in the optical axis direction and the changed direction value, when the change in the optical axis direction to which the optical axis of the camera is directed is detected while the moving object is moving. That is, when the third location information acquisition unit 14 calculates third location information obtained by correcting the second location information because the second location information is not a location within the area where the moving object is movable, the fourth location information acquisition unit 15 may generate the fourth location information by correcting the third location information. However, in a case where the operation of the third location information acquisition unit 14 is unnecessary because the second location information is a location within the area where the moving object is movable, the fourth location information acquisition unit 15 may generate the fourth location information by correcting the second location information.

As an example of the change in the optical axis direction in which the optical axis of the camera is directed while the moving object is moving, when the lane is changed while the vehicle travels along the lane, the optical axis direction of the image photographing apparatus installed in the vehicle may be changed along the lane marking change direction. In this case, the fourth location information acquisition unit 15 may calculate the magnitude value (for example, the angle of change in the optical axis direction, and the like) of the change in the optical axis direction to which the optical axis of the camera installed in the vehicle is directed, and the direction value (for example, left, right, and the like based on the current direction) of the change in the optical axis direction. In addition, the fourth location information acquisition unit 15 may acquire traveling information such as a traveling speed and acceleration of the vehicle. The fourth location information acquisition unit 15 may calculate the moving direction and distance of the vehicle according to the lane marking change based on the acquired magnitude value of the change in the optical axis direction, the direction value of the change in the optical axis direction, and the traveling information, and calculate the fourth location information obtained by correcting the second location information or the third location information based on the calculated moving direction and distance of the vehicle.

As another example, when a person changes the moving direction while moving (for example, when changing the direction to the second direction while walking or running in the first direction), the optical axis direction of the camera of a smartphone carried by a person may change. In this case, the fourth location information acquisition unit 15 may calculate the magnitude value (for example, the angle of change in the optical axis direction, and the like) of the change in the optical axis direction to which the optical axis of the camera of the smartphone carried by a person is directed, and the direction value (for example, left, right, and the like based on the current direction) of the change in the optical axis direction. In addition, the fourth location information acquisition unit 15 may acquire traveling information such as a traveling speed and acceleration of the person. The fourth location information acquisition unit 15 may calculate the moving direction and distance of the person according to the change in the moving direction of the person based on the acquired magnitude value of the change in the optical axis direction, the direction value of the change in the optical axis direction, and the traveling information, and calculate the fourth location information obtained by correcting the second location information or the third location information based on the calculated moving direction and distance of the person.

Hereinafter, the present disclosure will be described in more detail with reference to FIGS. 3A to 6B.

Figure 3A:
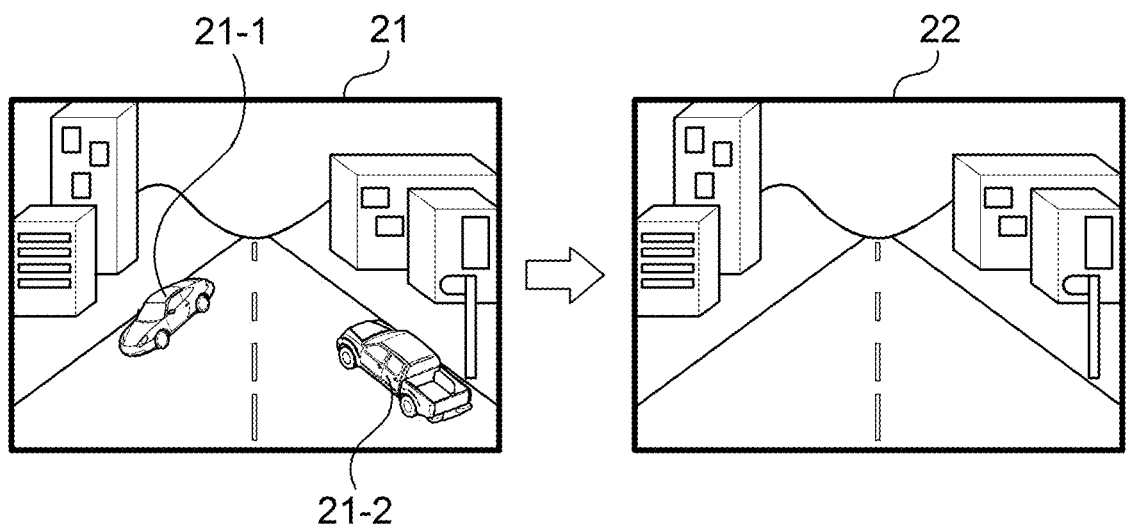
FIGS. 3A-4B are diagrams illustrating an image preprocessing process for acquiring second location information according to an embodiment of the present disclosure.
Figure 3B:
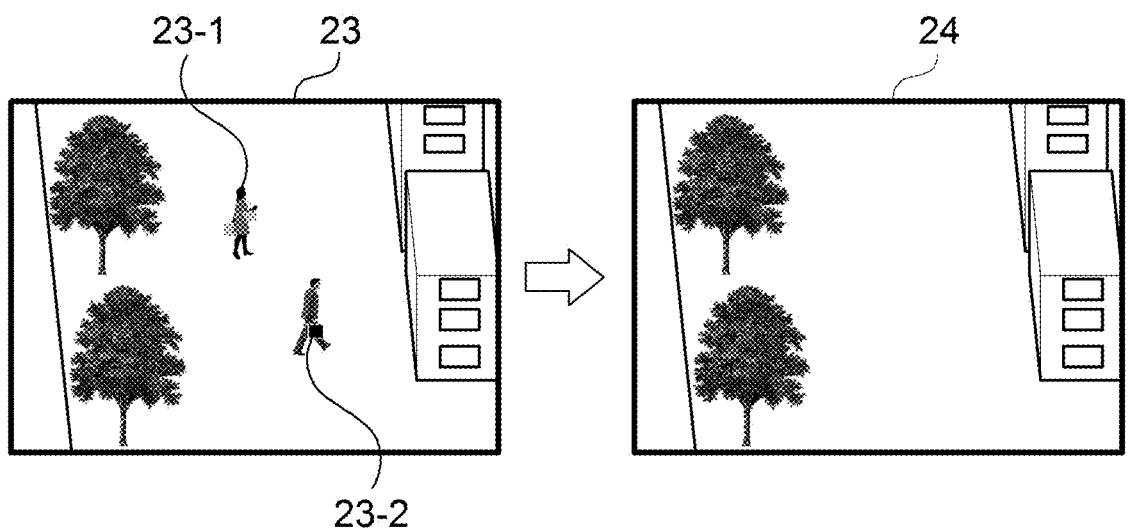

FIGS. 3A-3B are diagrams illustrating generating an image including only a static object during an image pre-processing process of acquiring second location information according to an embodiment of the present disclosure.

Referring to the left drawing of FIG. 3A, when the moving object is a vehicle, an image photographed by an image photographing device installed in the vehicle may include a roadway, a vehicle traveling on the roadway, a sidewalk, a building, a road sign, and the like. In this case, the image acquisition unit 11 may acquire the photographed surrounding image 21. In addition, the image processing unit 16 may detect a dynamic object from the surrounding image 21 using template matching or an artificial neural network model. As an example, the image processing unit 16 may detect vehicles 21-1 and 21-2 as the dynamic objects in the surrounding image 21 as illustrated on the left drawing of FIG. 3A.

In this case, the image processing unit 16 may generate an image including only the static object, excluding the dynamic object from the acquired surrounding image. As an example, as illustrated on the right side of FIG. 3A, the image processing unit 16 excludes vehicles 21-1 and 21-2 which are dynamic objects, and may generate an image 22 only including static objects such as sidewalks, buildings, and road signs.

In addition, referring to the left drawing of FIG. 3B, when the moving object is a person, an image photographed through a smartphone carried by the person may include trees, people, buildings, roadways, sidewalks, and the like. In this case, the image acquisition unit 11 may acquire the photographed surrounding image 23. In addition, the image processing unit 16 may detect a dynamic object from the surrounding image 23 using template matching or an artificial neural network model. As an example, the image processing unit 16 may detect a person as the dynamic objects in the surrounding image 23 as illustrated on the left drawing of FIG. 3B.

In this case, the image processing unit 16 may generate an image including only the static object, excluding the dynamic object from the acquired surrounding image. As an example, as illustrated on the right drawing of FIG. 3B, the image processing unit 16 excludes persons 23-1 and 22-2 which are dynamic objects, and may generate the image 22 only including static objects such as trees, buildings, sidewalks, and roadways.

Figure 4A:
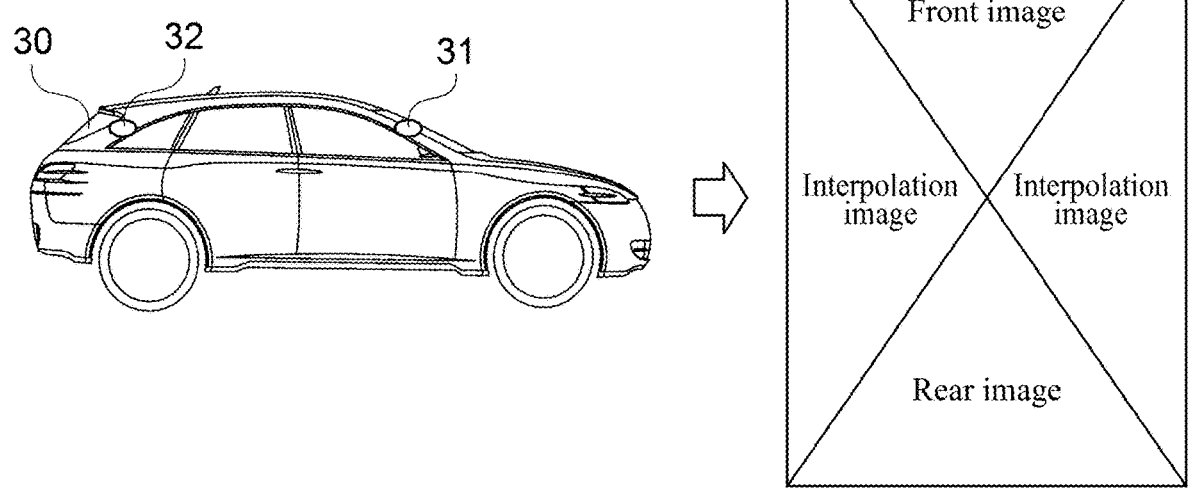
Figure 4B:
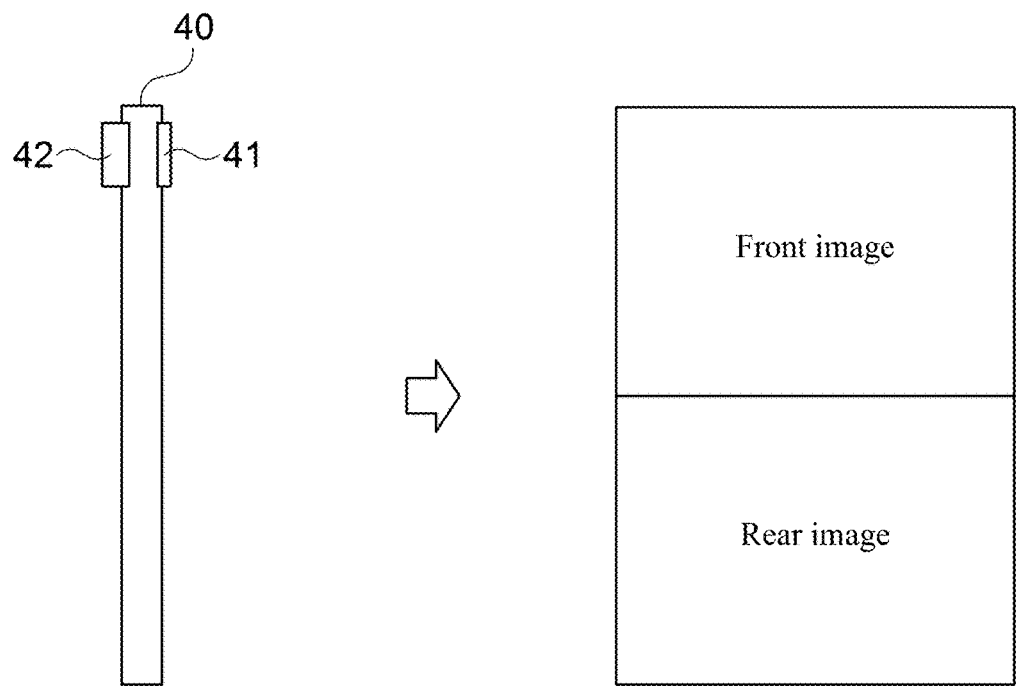

FIGS. 4A-4B are diagrams illustrating generating a combined image during an image pre-processing process of acquiring second location information according to an embodiment of the present disclosure.

Referring to the left drawing of FIG. 4A, when the moving object is a vehicle, the vehicle may include a front camera 31 for performing front photographing and a rear camera 32 for performing rear photographing in order to accurately record the traveling situation of the vehicle. The surrounding image acquired by the image acquisition unit 11 may include a front image photographed by a first camera and a rear image photographed by a second camera.

If it is not possible to cover all directions due to the angle of view of the front camera 31 and the angle of view of the rear camera 32, as illustrated on the right drawing of FIG. 4A, the image processing unit 16 may generate an interpolated image for interpolation of the remaining portion not covered by the angles of view of the front camera 31 and the rear camera 32. The interpolated image is an image for filling the remaining portions not covered by the front image and the rear image, and the image processing unit 16 may generate an interpolated image, and generate a final combined image including the generated interpolation image, the front image and the rear image. Specifically, the image processing unit 16 may detect portions with a difference in images by comparing adjacent images from a plurality of surrounding images acquired by the image acquisition unit 11 while the moving object is moving, and may generate the interpolated image by concatenating the detected portions. For example, when the moving object is moving, the portion included in the first surrounding image photographed at a first location at a first viewing angle may not be included in a second surrounding image photographed at a second location moved a predetermined distance from the first location at a second viewing angle. The image processing unit 16 according to the present disclosure may compare pixel values of images adjacent to each other in a plurality of surrounding images acquired by the image acquisition unit 11 to detect a partial image having a difference therebetween, and generate the interpolated image by sequentially concatenating the detected portions by time.

In addition, referring to the left drawing of FIG. 4B, when the moving object is a person, a person may carry a smartphone to receive various location based guides while moving, and the smartphone may include a front camera 41 that performs front photographing and a rear camera 42 that performs rear photographing. The surrounding image acquired by the image acquisition unit 11 may include a front image photographed by a first camera and a rear image photographed by a second camera.

If it is possible to cover all directions by the angle of view of the front camera 31 and the angle of view of the rear camera 32, as illustrated on the right drawing of FIG. 4B, the image processing unit 16 may generate the combined image in which the front image photographed by the front camera 41 and the rear image photographed by the rear camera 42 are combined.

Meanwhile, the combined image generated by the image processing unit 16 may be used to calculate the correction value for correction of the first location information, which is an absolute location calculated using the global navigation satellite system, and the second location information acquisition unit 13 may acquire the calculated second location information using the calculated correction value.

Figure 5A:
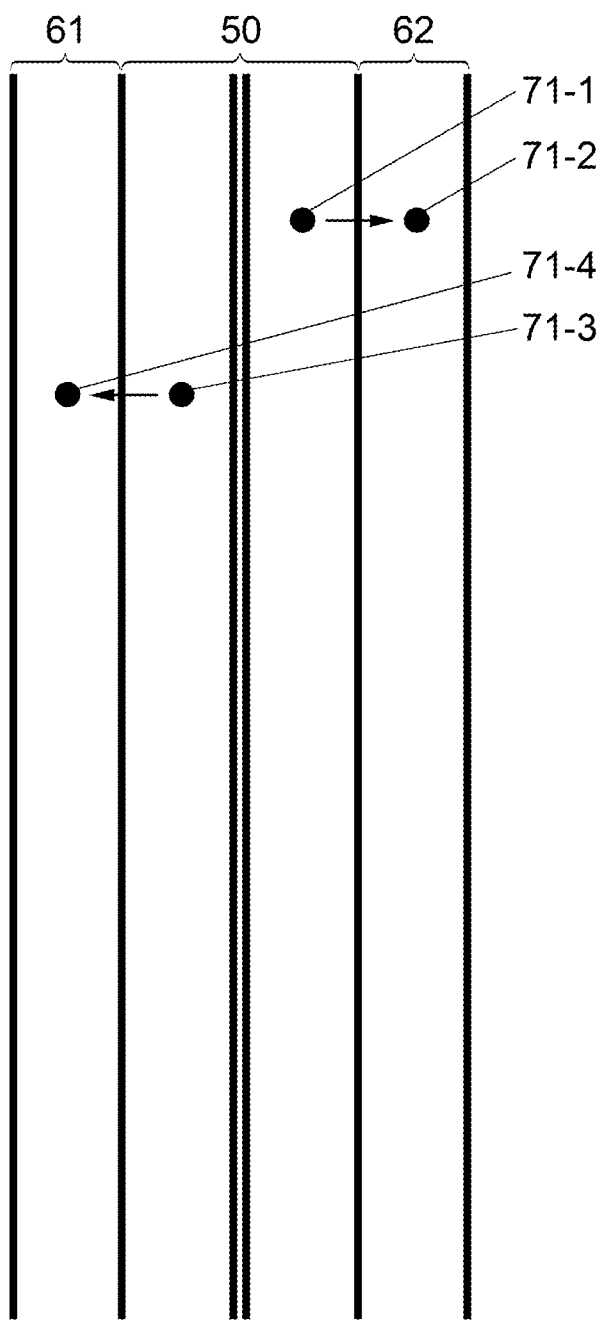
FIGS. 5A-5B are diagrams for describing a method for correcting a location according to a property of a moving object according to an embodiment of the present disclosure.
Figure 5B:
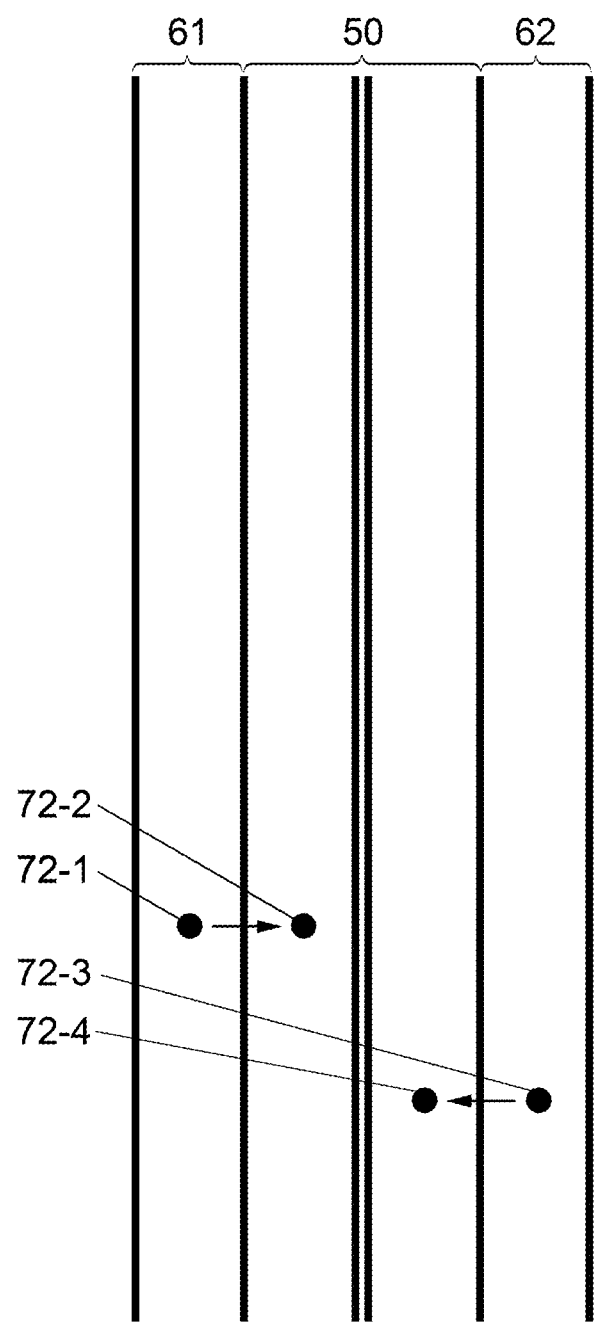

FIGS. 5A-5B are diagrams for describing a method for correcting a location according to a property of a moving object according to an embodiment of the present disclosure. Referring to FIGS. 5A-5B, the third location information acquisition unit 14 according to the present disclosure may determine the type of the moving object, and may determine whether the second location information acquired through the second location information acquisition unit 13 according to the type of determined moving objects is a location within the area where the moving object is movable.

For example, when the type of the moving object is a person, the movable area of the moving object may be set as a sidewalk and a crosswalk, and the non-movable area of the moving object may be set as a roadway. In this way, when second location information 71-1 and 71-3 is located on a roadway 50 as illustrated in FIG. 5A in the situation where the type of the moving object is determined to be the person, the third location information acquisition unit 14 determines that the second location information 71-1 and 71-3 is located in the non-movable area and the second location information 71-1 and 71-3 may be determined as inaccurate location information. However, exceptionally, since a crosswalk where a person is movable is formed on a roadway, when the second location information 71-1 and 71-3 according to the present disclosure is located on the crosswalk on the roadway 50, the third location information acquisition unit 14 may determine that the second location information 71-1 and 71-3 is located in the movable area and determine the second location information 71-1 and 71-3 as accurate location information.

In addition, the third location information acquisition unit 14 may calculate the third location information 71-2 and 71-4 obtained by correcting the second location information 71-1 and 71-3 to the third location within the area where the moving object is movable. For example, as illustrated in FIG. 5A, when the second location information 71-1 and 71-3 is not a location within the area where the person is movable, the third location information acquisition unit 14 may calculate the third location information 71-2 and 71-4 by laterally moving the second location information 71-1 and 71-3 acquired through the second location information acquisition unit 13 to be matched within the movable area.

In this case, the third location information acquisition unit 14 may calculate the third location information by laterally moving from the second location information in the roadway 50 to closer sidewalks 61 and 62. Specifically, when the second location information 71-1 is on the right side with respect to the center line of the roadway 50, the third location information acquisition unit 14 may calculate the third location information 71-2 located on the sidewalk 62 by laterally moving the second location information 71-1 to the right. Alternatively, when the second location information 71-3 is on the left side with respect to the center line of the roadway 50, the third location information acquisition unit 14 may calculate the third location information 71-4 located on the sidewalk 61 by laterally moving the second location information 71-3 to the left.

Meanwhile, as another example, when the type of the moving object is a vehicle, the area where the moving object is movable may be set as a roadway, and the non-movable area of the moving object may be set as a sidewalk. In this way, when the second location information 72-1 and 72-3 is located on the roadway 50 as illustrated in FIG. 5B in the situation where the type of the moving object is determined as the vehicle, the third location information acquisition unit 14 determines that the second location information 72-1 and 72-3 is located in the non-movable area and the second location information 72-1 and 72-3 may be determined as inaccurate location information.

In addition, the third location information acquisition unit 14 may calculate the third location information 72-2 and 72-4 obtained by correcting the second location information 72-1 and 72-3 to the third location within the movable area. For example, as illustrated in FIG. 5B, when the second location information 72-1 and 72-3 is not a location within the area where the vehicle is movable, the third location information acquisition unit 14 may calculate the third location information 72-2 and 72-4 by laterally moving the second location information 72-1 and 72-3 acquired through the second location information acquisition unit 13 to be matched within the movable area.

In this case, the third location information acquisition unit 14 may calculate the third location information by laterally moving from the second location information in the sidewalks 61 and 62 to the lane on the closer roadway 50. Specifically, when the second location information 72-1 is on the left sidewalk 61, the third location information acquisition unit 14 may calculate the third location information 72-2 located on the left lane with respect to the central line of the roadway 50 by laterally moving the second location information 72-1 to the right. Alternatively, when the second location information 72-3 is on the right sidewalk 62, the third location information acquisition unit 14 may calculate the third location information 72-4 located on the right lane with respect to the central line of the roadway 50 by laterally moving the second location information 72-3 to the left.

Figure 6A:
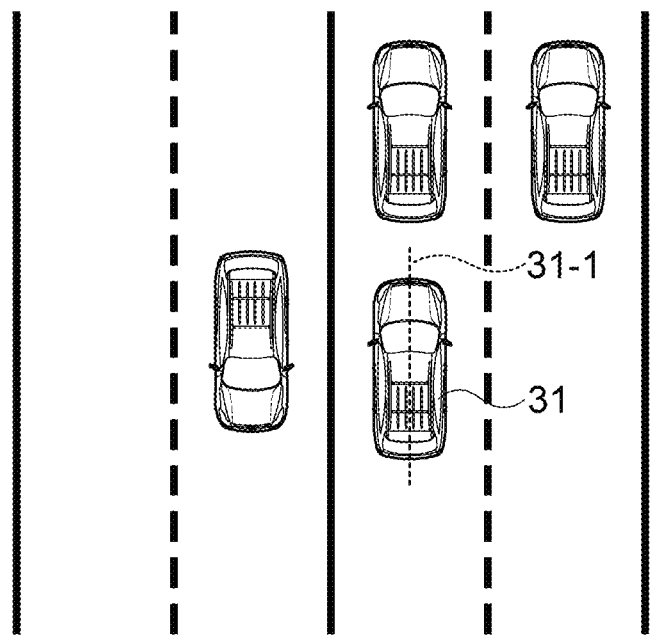
FIGS. 6A-6B are diagrams for describing a method for correcting a location according to an optical axis direction of a camera according to an embodiment of the present disclosure.
Figure 6B:
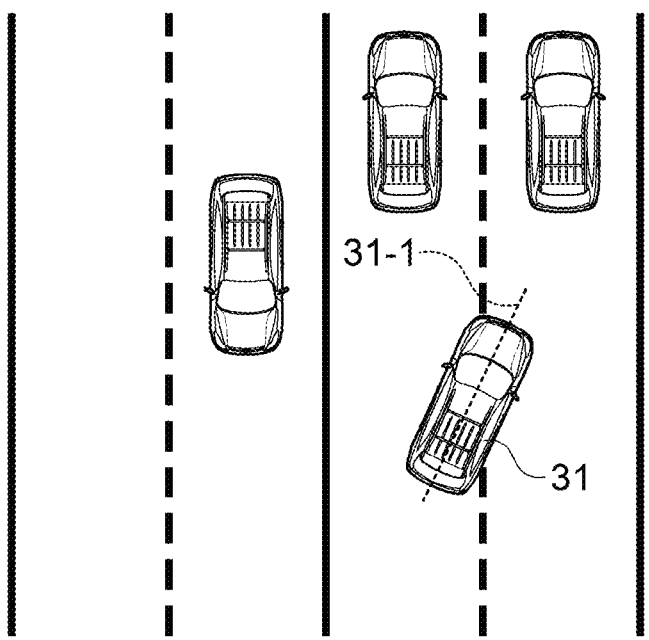

FIGS. 6A-6B are conceptual diagrams for describing a method for correcting a location according to an optical axis direction of a camera according to an embodiment of the present disclosure. The vehicle may be equipped with a camera to accurately record the traveling situation of the vehicle, and the optical axis direction of the camera to which the optical axis of the camera is directed is generally installed in the same direction as the traveling direction of the vehicle for efficient photographing within the angle of view. As described above, when the vehicle equipped with the camera is traveling on a roadway, the optical axis direction of the camera installed in the vehicle may be the same as the traveling direction of the vehicle.

As an example, referring to FIG. 6A, when the vehicle 31 travels along a lane in a true north direction, an optical axis direction 31-1 of the camera installed in the vehicle may be a true north direction.

However, as illustrated in FIG. 6B, when the vehicle 31 changes the lane from the first lane to the second lane while traveling, the optical axis direction 31-1 of the camera installed in the vehicle may change in a direction rotating by a predetermined angle to the right based on the true north direction according to the change in the lane of the vehicle.

Although not illustrated in FIGS. 6A-6B, when the vehicle changes the lane from the second lane to the first lane while traveling, the optical axis direction 31-1 of the camera installed in the vehicle may change in a direction rotating by a predetermined angle to the right based on the true north direction according to the change in the lane of the vehicle.

In this way, the optical axis direction of the camera installed in the vehicle 31 may change according to the direction in which the lane of the vehicle changes.

In this case, when the change in the optical axis direction to which the optical axis of the camera is directed is detected while the moving object is moving, the fourth location information acquisition unit 15 may generate fourth location information by correcting the second location information or the third location information based on the magnitude value of the change in the optical axis direction and the changed direction value. Specifically, the fourth location information acquisition unit 15 may calculate the size of the angle of change in the optical axis direction and the direction value of the change in the optical axis direction to which the optical axis of the camera installed in the vehicle is directed, calculate the traveling speed, the acceleration, and the like of the vehicle, and calculate the moving direction and distance of the vehicle according to the change in the lane by integrating the calculated data. The fourth location information acquisition unit 15 may calculate the fourth location information obtained by correcting the second location information or the third location information based on the calculated moving direction and distance of the vehicle.

The location measurement apparatus 10 according to the present disclosure described above may more accurately measure the location of the moving object by calculating the correction location information obtained by correcting the first location information acquired using the global navigation satellite system based on at least one of the surrounding image data photographed by the electronic device, the movable area data of the moving object, and the change data in the optical axis direction of the camera.

Hereinafter, the location measurement method according to the embodiment of the present disclosure will be described in more detail with reference to FIGS. 7 to 9.

FIG. 7 is a flowchart illustrating the location measurement method according to the embodiment of the present disclosure. Referring to FIG. 7, first, the location measurement apparatus may acquire a surrounding image photographed by the electronic device (S110).

In addition, the location measurement apparatus may acquire the first location information of the electronic device using the global navigation satellite system (S120).

In addition, the location measurement apparatus may acquire the second location information obtained by correcting the first location information by using the surrounding image photographed by the electronic device (S130). Here, the correction value for correction from the first location information to the second location information may be calculated through the detection of the image including the static object included in the traveling image photographed from the pre-stored real-world image map.

Meanwhile, according to the embodiment of the present disclosure, the acquired surrounding image may include the front image photographed by the first camera and the rear image photographed by the second camera. In this case, the location measurement method according to the embodiment of the present disclosure further includes combining the front image and the rear image in consideration of the angle of view of the camera, in which in the acquiring of the second location information (S130), the second location information obtained by correcting the first location information using the combined image may be acquired.

In addition, according to the embodiment of the present disclosure, the location measurement method may further include: generating an image including only the static object, excluding dynamic objects from the acquired surrounding image, in which in the acquiring of the second location information (S130), the second location information obtained by correcting the first location information using the generated image may be acquired.

FIG. 8 is a flowchart illustrating in more detail the location measurement method according to the embodiment of the present disclosure. Referring to FIG. 8, first, the surrounding image photographed by the electronic device may be acquired (S110).

In addition, the location measurement apparatus may acquire the first location information of the electronic device using the global navigation satellite system (S120).

In addition, the location measurement apparatus may acquire the second location information obtained by correcting the first location information by using the surrounding image photographed by the electronic device (S130).

In addition, the location measurement apparatus may determine whether the second location information is a location within the area where the moving object is movable according to the type of vehicle (S140). Here, in the determining S140, the type of the moving object may be determined, and the movable area of the moving object may be determined according to the determined type of the moving object.

When the second location information is not a location within the area where the moving object is movable (S140: N), the location measurement apparatus may acquire the third location information obtained by correcting the second location information to the third location within the movable area (S150). For example, in the acquiring of the third location information (S150), the third location information may be acquired by laterally moving the second location information to be matched within the movable area.

In addition, when the change in the optical axis direction to which the optical axis of the camera is directed is detected while the moving object is moving, the location measurement apparatus may correct the third location information based on the magnitude value of the change in the optical axis direction and the changed direction value to generate the fourth location information (S160).

Alternatively, when the second location information is a location within the area where the moving object is movable (S140: Y), when the change in the optical axis direction to which the optical axis of the camera is directed is detected while the moving object is moving, the location measurement apparatus may generate the fourth location information obtained by correcting the second location information based on the magnitude value of the change in the optical axis direction and the changed direction value (S160).

FIG. 9 is a block diagram illustrating in more detail a process of calculating second location information based on a surrounding image according to an embodiment of the present disclosure. Referring to FIG. 9, first, a real-world image map matching the first location information may be detected (S121). Specifically, according to the present disclosure, a real-world image map may be stored, in which the real-world image map may store a real-world image representing the real world as an image and location information matching the corresponding image. If the first location information and the surrounding image are acquired by the first location information acquisition unit, in the detecting (S121), the real-world image map matching the received first location information among the real-world image maps stored in the database may be detected. In addition, the image including the static object included in the surrounding image may be detected from the detected image map by comparing the detected image map with the received surrounding image (S122). Specifically, in the detecting (S122), the image including the static object of the surrounding image from the detected real-world image map may be detected by comparing the detected real-world image map with the received surrounding image. In addition, the location information matching the detected image may be detected.

Specifically, steps S121 and S122 of FIG. 9 will be described with reference to FIGS. 15 and 16.

Figure 15:
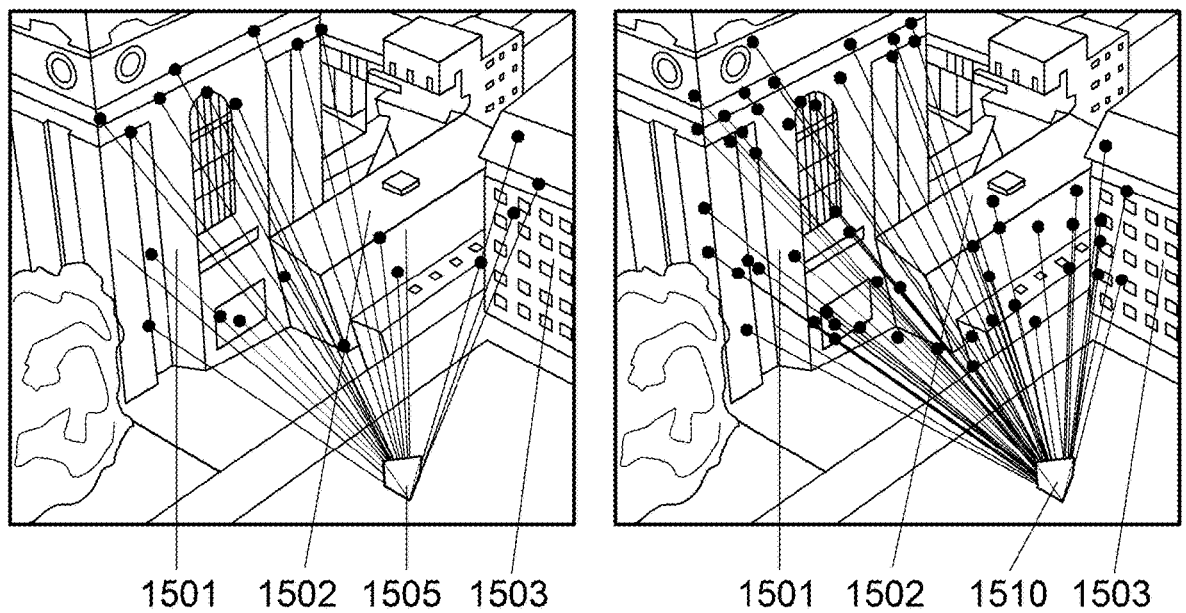
FIG. 15 is a diagram for describing a method for extracting a plurality of feature points from objects on an image acquired through a camera of an electronic device by the location measurement apparatus according to the embodiment of the present disclosure.

FIG. 15 illustrates extracting a plurality of feature points from objects on the image acquired through the camera of the electronic device by the location measurement apparatus 10 according to the embodiment of the present disclosure. Reference numerals 1505 and 1510 of FIG. 15 may be seen that the number of feature points extracted from building varies according to the angle of view of the camera. Therefore, in order for the location measurement apparatus 10 to accurately detect a specific static object located near a specific point where the electronic device is located, like reference numerals 1505 and 1510, it is preferable to photograph the static object at various angles of view of the camera mounted on the electronic device. When the feature points of a specific static object are acquired as illustrated in FIG. 15, the location measurement apparatus transmits the acquired feature points to the server. The server detects the static object having characteristics matching the feature points from the image map already stored in the database, checks the location of the detected static object, and transmits the checked location of the static object to the location measurement apparatus 10. In the present disclosure, the location information of the static object identified through the comparison of the feature points in the server is referred to as reference location information.

In this way, the location measurement apparatus grasps actual location information of the electronic device through the reference location information of buildings located around the electronic device, thereby accurately correcting the location error of the electronic device caused by poor GPS reception and the like. Therefore, according to the embodiment of the present disclosure, the electronic device may correct the location information measured by the GPS signal using the reference location information which is the location information received from the location measurement apparatus 10 even in the urban environment in which the GPS shaded area exists due to high-rise buildings. In addition, the electronic device according to the embodiment of the present disclosure may measure its own location by using the reference location information measured from the server by the location measurement apparatus without receiving the GPS signal. Specifically, the location measurement apparatus 10 may correct the location of the electronic device using the reference location information received from the server and the information such as the location and direction of the electronic device away from the static object corresponding to the reference location information. In other words, in order to acquire the reference location information from the server, the static object is photographed through the camera of the electronic device, and the location measurement apparatus 10 measures the location of the electronic device using the information such as the distance and direction between the camera and the static object stored at this time, and the reference location information received from the server.

Figure 16:
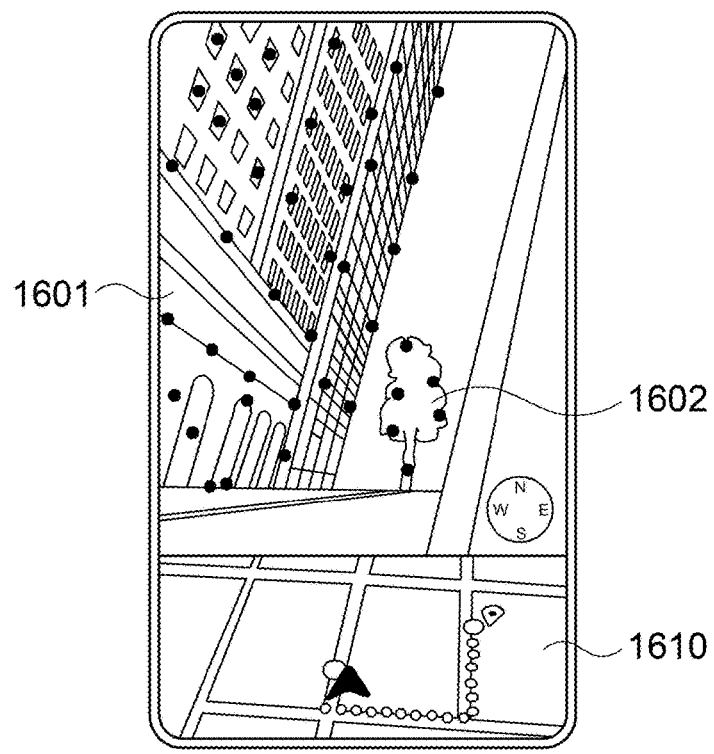
FIG. 16 is a diagram illustrating that the feature points are extracted from a static object located around a user on a screen of the user electronic device according to an embodiment of the present disclosure.

FIG. 16 is a diagram illustrating that the feature points are extracted from a static object located around a user on a screen of the user electronic device according to an embodiment of the present disclosure. As illustrated in FIG. 16, when characteristic points of a specific static object, for example, a building 1601 and a tree 1602 are acquired through the user electronic device 100, the location measurement apparatus 10 transmits the acquired feature points to a server, and the server detects the static object having characteristics matching the feature points in the image map already stored in the database, checks the location of the detected static object, and then transmits the checked location of the static object to the location measurement apparatus 10. In this case, the location measurement apparatus 10 may calculate the location correction information for correcting the location of the electronic device 100 using the location of the static object, and transmit the calculated correction information to the electronic device 100, thereby enabling the accurate location measurement in the area where the GPS signals are not smoothly received, such as in urban areas.

Meanwhile, a mini-map may be displayed on one area 1610 of the screen.

In addition, the correction value for the correction of the first location information may be calculated by calculating the difference in the viewing angles between the detected image and the surrounding image (S123). Specifically, in the calculating (S123), a first correction value may be generated by calculating the difference between the location information of the detected image and the first location information, a second correction value may be generated by calculating the difference in the viewing angles between the detected image and the surrounding image, and a correction value for the correction of the first location information may be calculated by integrating the generated first correction value and second correction value.

Then, the second location information may be calculated based on the calculated correction value (S124). Specifically, in the calculating (S124), the second location information may be calculated using the correction value for the correction of the first location information calculated by integrating the first correction value and the second correction value.

Meanwhile, all or part of each step included in FIG. 9 described above may be implemented to be performed by the image analysis server. Alternatively, all or part of each step included in FIG. 9 described above may be implemented to be performed by the location measurement apparatus 10. When some of each step included in FIG. 9 are implemented to be performed by the image analysis server, some of the remaining steps may be implemented to be performed by the location measurement apparatus 10.

Hereinafter, an electronic device according to an embodiment of the present disclosure and a method for providing a location based guide using the same will be described in more detail with reference to FIGS. 10 to 14.

FIG. 10 is a block diagram illustrating an electronic device according to an embodiment of the present disclosure. Referring to FIG. 10, the electronic device 100 is configured to include all or some of a storage unit 110, an input unit 120, an output unit 130, a location measuring unit 140, an augmented reality providing unit 160, a control unit 170, a communication unit 180, a sensing unit 190, and a power supply unit 195.

Here, the electronic device 100 is a device that provides a location based guide to a driver who moves a vehicle or a pedestrian who moves using his or her body part, and the electronic device 100 may be implemented as various devices such as a smartphone, a tablet computer, a notebook computer, a personal digital assistant (PDA), a portable multimedia player (PMP), smart glasses, project glasses, navigation, and a car dash cam or a car video recorder that is an image recording device for a vehicle.

Here, the location based guide may include various kinds of guide for assisting in driving of the driver of the vehicle, such as route guidance, lane marking departure guidance, lane marking keeping guidance, front vehicle start guidance, signal lamp change guidance, front vehicle collision preventing guidance, lane marking change guidance, lane guidance, a curve guidance, and the like.

Here, the route guidance may include a driver route guidance for a driver of a vehicle and a pedestrian route guidance for a person. That is, the route guidance according to the present disclosure may be interpreted as a concept including the route guidance in the case in which the user walks or runs and moves as well as in the case in which the user gets in the vehicle and then drives the vehicle.

Here, the driver route guidance and the pedestrian route guidance may include augmented reality route guidance performing route guidance by combining various information such as a location, a direction, and the like, of a user with an image obtained by photographing the front of the vehicle and two-dimensional (2D) or three-dimensional (3D) route guidance performing route guidance by combining various information such as a location, a direction, and the like, of a user with a 2D or 3D map data.

In addition, the route guidance may include an air map route guidance that combines various information such as a location and a direction of a user with air map data to perform the route guidance.

In addition, the lane marking departure guidance may be to guide whether or not the vehicle that is traveling is out of lane marking.

In addition, the lane marking keeping guidance may guide the vehicle to return to the lane in which the vehicle is originally traveling.

In addition, the front vehicle start guidance may be to guide whether or not a vehicle located in front of a vehicle that is being stopped has started.

In addition, the traffic light change guidance may be for guiding whether or not a traffic light located in front of a vehicle that is being stopped has been changed. As an example, the signal lamp change guidance may be for guiding that a state of the signal lamp is changed from a red lamp indicating a stop signal into a blue lamp indicating a start signal.

In addition, the front vehicle collision preventing guidance may be a guide for preventing a collision with a front vehicle when a distance from a vehicle located in front of a vehicle stopped or traveling is within a certain distance.

In addition, the lane marking change guidance may be for guiding a change from a lane in which a vehicle is located into another lane in order to guide a route up to a destination.

In addition, the lane guidance may be for guiding a lane in which a vehicle is currently located.

In addition, the curve guidance may be for guiding that a road on which a vehicle will travel is a curve after a predetermined time.

Such surrounding images that enable the provision of various types of guidance may be photographed by the camera. For example, when the moving object is a vehicle, the camera may be a camera that is formed integrally with the electronic device 100 mounted in the vehicle and photographs the front of the vehicle. As another example, the camera may be a camera mounted in the vehicle separately from the electronic device 100 and photographing the front of the vehicle. In this case, the camera may be a separate vehicle imaging device such as the car dash cam or the car video recorder mounted toward the front of the vehicle, and the electronic device 100 may receive a photographed image through wired/wireless communication with the separately mounted vehicle imaging device or the electronic device 100 may receive the photographed image when a storage medium storing the photographed image of the vehicle imaging device is inserted into the electronic device 100.

Hereinafter, the electronic device 100 according to the embodiment of the present disclosure will be described in more detail on the basis of the above-mentioned content.

The storage unit 110 serves to store various data and applications required for an operation of the electronic device 100 therein. Particularly, the storage unit 110 may store data required for the operation of the electronic device 100, for example, an operating system (OS), a route search application, a map data, and the like, therein. In addition, the storage unit 110 may store data generated by the operation of the electronic device 100, for example, a searched route data, a received image, and the like, therein.

The storage unit 110 may be implemented by a detachable type of storing device such as a universal serial bus (USB) memory, or the like, as well as an embedded type of storing device such as a random access memory (RAM), a flash memory, a read only memory (ROM), an erasable programmable ROM (EPROM), an electronically erasable and programmable ROM (EEPROM), a register, a hard disk, a removable disk, a memory card, a universal subscriber identity module (USIM), or the like.

The input unit 120 serves to convert a physical input from the outside of the electronic device 100 into a specific electrical signal. Here, the input unit 120 may include all or some of a user input unit 121 and a microphone unit 123.

The user input unit 121 may receive a user input such as a touch, a push operation, or the like. Here, the user input unit 121 may be implemented using at least one of a form of various buttons, a touch sensor receiving a touch input, and a proximity sensor receiving an approaching motion.

The microphone unit 123 may receive a speech of the user and a sound generated in the inside and the outside of the vehicle.

The output unit 130 is a device that outputs data of the electronic device 100 to a user as video and/or audio. Here, the output unit 130 may include all or some of a display unit 131 and an audio output unit 133.

The display unit 131 is a device outputting data that may be visually recognized by the user. The display unit 131 may be implemented by a display unit provided on a front surface of a housing of the electronic device 100. In addition, the display unit 131 may be formed integrally with the electronic device 100 and output visual recognition data, or may be installed separately from the electronic device 100 like a head-up display (HUD) and output visual recognition data.

The audio output unit 133 is a unit outputting data that may be auditorily recognized in the electronic device 100. The audio output unit 133 may be implemented by a speaker representing a data that is to be reported to the user of the electronic device 100 as a sound.

The location measuring unit 140 may perform the function of the location measurement apparatus 10 described above.

The augmented reality providing unit 160 may provide an augmented reality view mode. Here, the augmented reality may be a method for visually superimposing and providing additional information (for example, a graphic element indicating a point of interest (POI), a graphic element guiding a danger of a front vehicle collision, graphic elements indicating vehicle-to-vehicle distance, graphic elements guiding curves, various additional information to assist driver's safe driving, and the like) on a screen containing the real world that the user actually sees.

The augmented reality providing unit 160 may include all or part of a calibration unit, a 3D space generation unit, an object generation unit, and a mapping unit.

The calibration unit may perform calibration for estimating camera parameters corresponding to the camera from the photographed image photographed in the camera. Here, the camera parameters, which are parameters configuring a camera matrix, which is information indicating a relationship between a real space and a photograph, may include camera extrinsic parameters and camera intrinsic parameters.

The 3D space generating unit may generate a virtual 3D space on the basis of the photographed image photographed by the camera. In detail, the 3D space generating unit may generate the virtual 3D space by applying the camera parameters estimated by the calibration unit to a 2D photographed image.

The object generation unit may generate an object for guidance on augmented reality, for example, a front vehicle collision prevention guide object, a route guide object, a lane marking change guide object, a lane marking departure guide object, a curve guide object, and the like.

The mapping unit may map an object generated by the object generation unit to a virtual 3D space generated by the 3D space generation unit. In detail, the mapping unit may determine a location in the virtual 3D space of the object generated by the object generation unit, and perform mapping of the object to the determined location.

Meanwhile, the communication unit 180 may be provided in order for the electronic device 100 to communicate with other devices. The communication unit 180 may include all or some of a location data unit 181, a wireless Internet unit 183, a broadcasting transmitting and receiving unit 185, a mobile communication unit 186, a short range communication unit 187, and a wired communication unit 189.

The location data unit 181 is a device obtaining location data through a global navigation satellite system (GNSS). The GNSS means a navigation system that may calculate a location of a receiving terminal using a radio signal received from an artificial satellite. As a detailed example of the GNSS may include a global positioning system (GPS), a Galileo system, a global orbiting navigational satellite system (GLONASS), a COMPASS, an Indian regional navigational satellite system (IRNSS), a quasi-zenith satellite system (QZSS), and the like, depending on an operating subject of the GNSS. The location data unit 181 of the system according to the embodiment of the present disclosure may obtain location data by receiving GNSS signals served in an area in which the electronic device 100 is used. Alternatively, the location data unit 181 may obtain location data through communication with a base station or an access point (AP) in addition to the GNSS.

The wireless Internet unit 183 is a device accessing the wireless Internet to obtain or transmit data. The wireless Internet unit 183 may access the Internet network through various communication protocols which are defined to perform wireless data transmission and reception of wireless LAN (WLAN), wireless broadband (Wibro), world interoperability for microwave access (Wimax), and high speed downlink packet access (HSDPA).

The broadcasting transmitting and receiving unit 185 is a device transmitting and receiving broadcasting signals through various broadcasting systems. The broadcasting system that may transmit and receive the broadcasting signals through the broadcasting transmitting and receiving unit 185 may be a digital multimedia broadcasting terrestrial (DMBT), digital multimedia broadcasting satellite (DMBS), a media forward link only (MediaFLO), a digital video broadcast handheld (DVBH), an integrated services digital broadcast terrestrial (ISDBT), or the like. The broadcasting signals transmitted and received through the broadcasting transmitting and receiving unit 185 may include a traffic data, a living data, and the like.

The mobile communicating unit 186 may access a mobile communication network depending on various mobile communication protocols such as 3rd generation (3G), 3rd generation partnership project (3GPP), long term evolution (LTE), and the like, thereby performing voice and data communication.

The short range communication unit 187 is a device for short range communication. The short range communication unit 187 may perform communication through Bluetooth, radio frequency identification (RFID), infrared data association (IrDA), ultra wideband (UWB), ZigBee, near field communication (NFC), wireless-fidelity (Wi-Fi), or the like, as described above.

The wired communication unit 189 is an interface device that may connect the electronic device 100 to other devices in a wired manner. The wired communication unit 189 may be a USB module that may perform communication through a USB port.

The communication unit 180 may communicate with other devices using at least one of a location data unit 181, a wireless Internet unit 183, a broadcasting transmitting and receiving unit 185, a mobile communication unit 186, a short range communication unit 187, and a wired communication unit 189.

For example, when the electronic device 100 does not include a camera function, the electronic device 100 may receive an image photographed by a vehicle imaging device such as a car dash cam or a car video recorder through at least one of a short range communication unit 187 or a wired communication unit 189.

As another example, in the case of the communication with a plurality of devices, any one thereof may communicate through the short range communication unit 187, and the other thereof may communicate through the wired communication unit 119.

The sensing unit 190 is a device that may detect a current state of the electronic device 100. The sensing unit 190 may include all or some of a motion sensing unit 191 and an optical sensing unit 193.

The motion sensing unit 191 may detect a motion of the electronic device 100 on a 3D space. The motion sensing unit 191 may include a tri-axial terrestrial magnetism sensor and a tri-axial acceleration sensor. Motion data obtained through the motion sensing unit 191 may be combined with the location data obtained through the location data unit 181 to more accurately calculate a trajectory of the vehicle to which the electronic device 100 is attached.

The optical sensing unit 193 is a device measuring surrounding illuminance of the electronic device 100. Brightness of the display unit 131 may be changed so as to correspond to surrounding brightness using illuminance data acquired through the optical sensing unit 193.

The power supply unit 195 is a device supplying power required for an operation of the electronic device 100 or an operation of another device connected to the electronic device 100. The power supply unit 195 may be a device receiving power from a battery embedded in the electronic device 100, or an external power supply such as a vehicle. In addition, the power supply unit 195 may be implemented by the wired communication unit 189 or a device receiving power in a wireless scheme depending on a scheme in which it receives the power.

The control unit 170 controls a general operation of the electronic device 100. In detail, the control unit 170 may control all or some of the storage unit 110, the input unit 120, the output unit 130, the location measuring unit 140, the augmented reality providing unit 160, the communication unit 180, the sensing unit 190, and the power supply unit 195.

In particular, the control unit 170 may provide the location based guide by using the location information calculated by the location measuring unit 140. Here, the calculated location information may be the correction location information corrected based on at least one of the surrounding image data acquired by photographing the first location information measured using the global navigation satellite system through the electronic device 100, the movable area data of the moving object, and the change data in the optical axis direction of the camera.

Specifically, the control unit 170 may generate the location based guide object using the correction location information calculated by the location measuring unit 140, and control the display unit 131 to display the augmented reality image in which the generated location based guide object and the photographed surrounding image are combined.

Here, the location based guide object displayed in the augmented reality may be a route guide object. Specifically, the control unit 170 may determine the current location of the moving object using the correction location information calculated by the location measuring unit 140, and generate the route guide object composed of the first point indicating the current location of the moving object in the augmented reality image and the second point indicating a vanishing point of the route along which the moving object needs to be moved and a route expressed in the augmented reality image in order to move from the first point to the destination. Here, the vanishing point may mean a point where routes are gathered at one point on a horizontal line as being infinitely away from the first point.

In this case, the route may have a shape in which the first point and the second point are connected by a line, a figure, or the like and may include a direction expression identifier indicating the direction of the route by an arrow or the like.

In addition, the control unit 170 may generate a mini-map using the correction location information calculated by the location measuring unit 140 and control the display unit 131 to display the generated mini-map. In particular, the control unit 170 may control the display unit 131 to display the generated mini-map and the photographed image together.

In addition, when the calibration information of the initially set camera is different from the calibration information estimated in calibration due to the movement of the electronic device 100, the control unit 170 may control the location, angle of view, direction, and the like of the camera to maintain the camera to be the same as the calibration information of the initially set camera.

Therefore, according to the present disclosure, it is possible to increase the movement convenience of the pedestrian or the vehicle driver by providing the pedestrian or vehicle driver with the route guidance service or the mini-map service based on the exact location to allow the pedestrian or the vehicle driver to accurately recognize his/her current location and to smoothly move to the destination.

Figure 11:
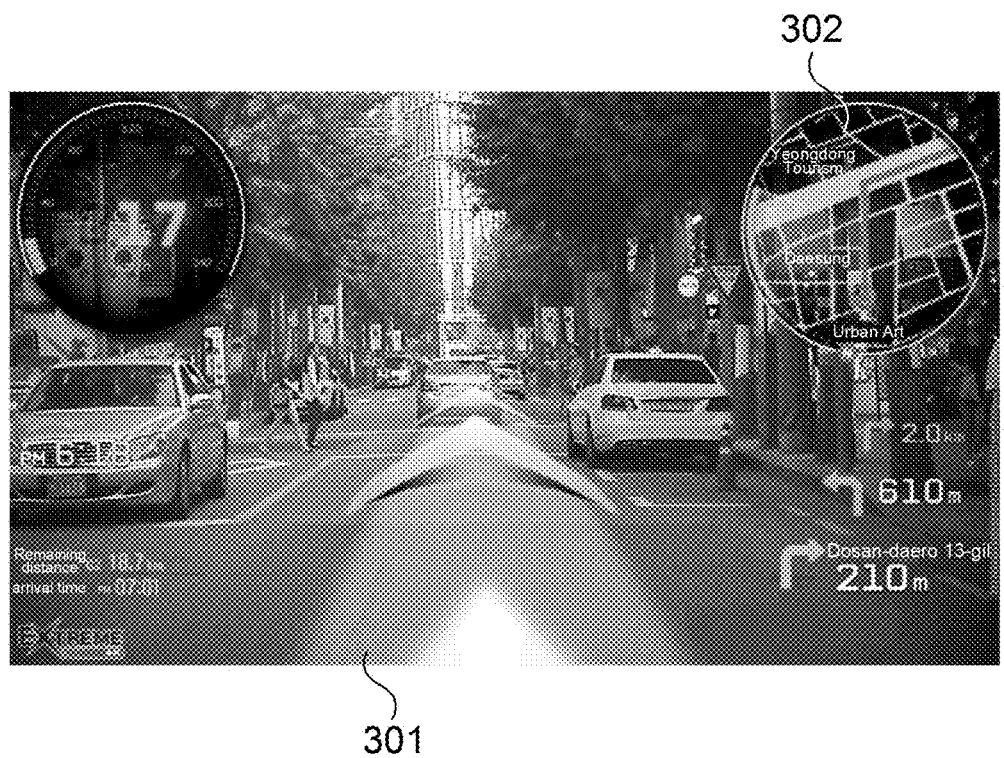
FIG. 11 is a diagram illustrating a driver route guidance screen according to an embodiment of the present disclosure.

FIG. 11 is a diagram illustrating a pedestrian route guide screen according to an embodiment of the present disclosure. Referring to FIG. 11, a route guide object 301 indicating a route to which the vehicle needs to travel may be generated using the correction location information calculated by the location measuring unit 140 of the electronic device for a vehicle that provides the location based guide to the driver, and the generated route guide object 301 may be output through the augmented reality.

Here, the route guide object 301 expressed as augmented reality may generate the route guide object composed of the first point indicating the current location of the moving object in the augmented reality image and the second point indicating a vanishing point of the route along which the moving object needs to be moved and a route expressed in the augmented reality image in order to move from the first point to the destination. Here, the location of the route guide object 301 at the bottom of the screen may indicate the current location of the moving object measured by the location measuring unit 140.

In this case, the route may have a shape in which the first point and the second point are connected by a line, a figure, or the like and may include a direction expression identifier indicating the direction of the route by an arrow or the like. The route guide object 301 may be displayed on the roadway of the augmented reality image to guide the vehicle driver from the current location to the destination.

In addition, the control unit 170 may generate a mini-map 302 using the correction location information calculated by the location measuring unit 140 and control the display unit 131 to display the generated mini-map 302.

Figure 12:
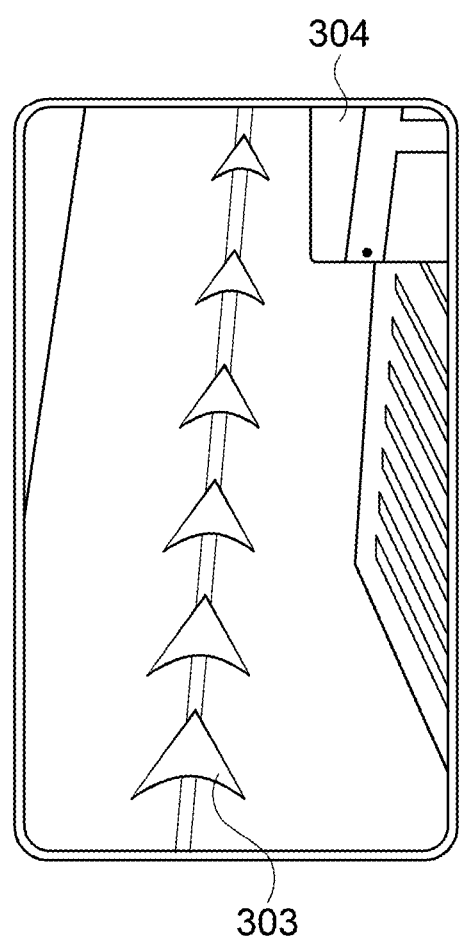
FIG. 12 is a diagram illustrating a pedestrian route guidance screen according to an embodiment of the present disclosure.

FIG. 12 is a diagram illustrating a pedestrian route guide screen according to an embodiment of the present disclosure. Referring to FIG. 12, a route guide object 303 indicating a route to which the pedestrian needs to move may be generated using the correction location information calculated by the location measuring unit 140 of the electronic device for a pedestrian that provides the location based guide to the pedestrian, and the generated route guide object 303 may be output through the augmented reality.

Here, the generated route is displayed on the sidewalk of the augmented reality image to guide the pedestrian from the current location to the destination.

In addition, the control unit 170 may generate a mini-map 304 using the correction location information calculated by the location measuring unit 140 and control the display unit 131 to display the generated mini-map 304. At this time, it is preferable to display the mini-map 304 at a point that does not overlap with the route regardless of the top, bottom, left, and right of the screen.

Figure 13:
FIG. 13 is a diagram illustrating a mini-map display screen according to another embodiment of the present disclosure.

FIG. 13 is a diagram illustrating a mini-map display screen according to another embodiment of the present disclosure. Referring to FIG. 13, according to another embodiment of the present disclosure, the control unit 170 may determine the current location using the correction location information calculated by the location measuring unit 140, generate the mini-map 305 to display the current location on a map, and control the display unit 131 to display the generated mini-map 305 and the photographed image together.

That is, according to another embodiment of the present disclosure, unlike FIGS. 11 and 12, it may be implemented to display only the mini-map 305 without displaying the augmented reality guide object.

According to this present disclosure, in an electronic device equipped with a low-performance processor, the exact location measured by the location measuring unit 140 is expressed through the mini-map, so that it is possible to increase the movement convenience of pedestrians or vehicle drivers, such as allowing pedestrians or vehicle drivers to accurately recognize their current location and smoothly move to their destination.

Hereinafter, the image analysis server according to the embodiment of the present disclosure will be described with reference to FIG. 14.

Figure 14:
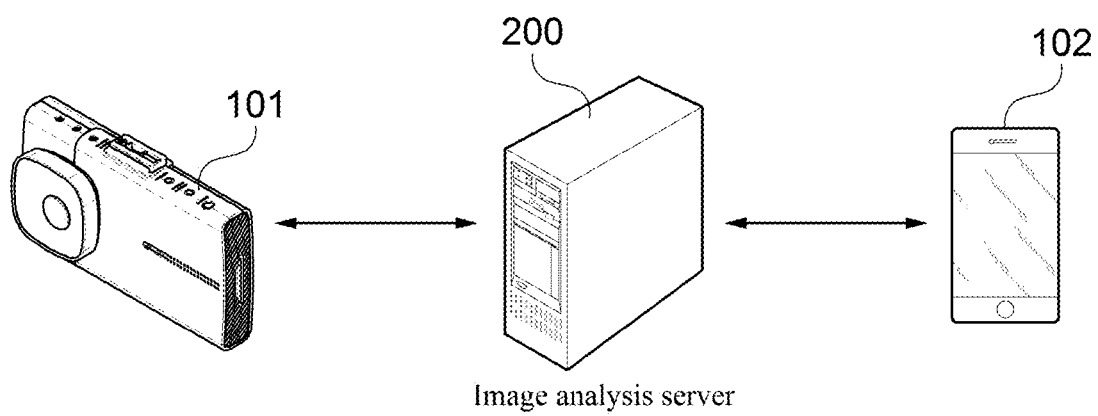
FIG. 14 is a block diagram illustrating a location correction system according to an embodiment of the present disclosure.

FIG. 14 is a block diagram illustrating a location correction system according to an embodiment of the present disclosure. Referring to FIG. 14, a location correction system 1000 may include a first electronic device 101, a second electronic device 102, and an image analysis server 200. Here, the first electronic device 101 may be an image photographing device for a vehicle such as a car dash cam or a car video recorder installed in a vehicle, and the second electronic device 102 may be implemented as a mobile terminal device such as a smartphone carried by a pedestrian.

The location correction system 1000 may receive the surrounding image and first location information based on the global navigation satellite system from the first electronic device 101 and the second electronic device 102, and calculate the second location information by correcting the received first location information using the received surrounding image.

For example, the image analysis server 200 may measure the current location of the first electronic device 101 through data transmission/reception with the first electronic device

101. Specifically, the image analysis server 200 may receive the surrounding image photographed by the first electronic device 101 and the first location information based on the global navigation satellite system. In this case, the image analysis server 200 may detect the real-world image map matching the received first location information among the real-world image maps stored in the database. In addition, the image analysis server 200 may compare the detected real-world image map with the received surrounding image to detect the image including the static object of the surrounding image from the detected real-world image map. In addition, the image analysis server 200 may detect the location information matched with the detected image. In addition, the image analysis server 200 may calculate the difference in viewing angles between the detected image and the surrounding image and the difference between the location information of the detected image and the first location information to calculate the correction value for correcting the first location information, and may calculate the second location information based on the calculated correction value. In addition, the image analysis server 200 may transmit the calculated second location information to the first electronic device 101.

In this case, the first electronic device 101 may provide the location based guide service using the received second location information. Alternatively, the first electronic device 101 may perform additional correction on the received second location information based on at least one of the movable area data of the vehicle and the change data in the optical axis direction of the camera, and calculate more accurate location information based thereon.

Meanwhile, the image analysis server 200 may measure the current position of the second electronic device 102 through data transmission/reception with the second electronic device 102, and a specific operation of the image analysis server 200 may be as described above.

Meanwhile, according to the above-described example, it has been described as an example that the calculation of the third location information and the calculation of the fourth location information are performed by each of the terminals 101 and 102, but are not limited thereto. According to another embodiment of the present disclosure, at least one of the calculation of the third location information and the calculation of the fourth location information may be implemented to be performed by the image analysis server 200.

In the specification and the claims, terms such as "first", "second", "third", "fourth", and the like, if any, will be used to distinguish similar components from each other and be used to describe a specific sequence or a generation sequence, but is not necessarily limited thereto. It will be understood that these terms are compatible with each other under an appropriate environment so that embodiments of the present disclosure set forth herein may be operated in a sequence different from a direction illustrated or described herein. Likewise, when a method herein is described as comprising a series of steps, the order of those steps presented herein is not necessarily the order in which those steps can be performed, and any described steps may be omitted. Any other steps not described herein could be added to the method.

In addition, in the disclosure and the claims, terms such as "left", "right", "front", "rear", "top", "bottom", "over", "under", and the like, if any, do not necessarily indicate relative locations that are not changed, but are used for explanation. It will be understood that these terms are compatible with each other under an appropriate environment so that embodiments of the present disclosure set forth herein may be operated in a direction different from a direction illustrated or described herein. A term "connected" used herein is defined as being directly or indirectly connected in an electrical or non-electrical scheme. Here, targets described as being "adjacent to" each other may physically contact each other, be close to each other, or be in the same general range or region, in a context in which the above phrase is used. Here, a phrase "in an embodiment" means the same embodiment, but is not necessarily limited thereto.

In addition, in the disclosure and the claims, terms such as "connected", "connecting", "linked", "linking", "coupled", "coupling", and the like, and various modifications of these terms may be used as the meaning including that one component is directly connected to another component or is indirectly connected to another component through the other component.

In addition, terms "module" and "unit" for components used in the present disclosure are used only in order to easily make the disclosure. Therefore, these terms do not have meanings or roles that distinguish from each other in themselves.

Terms used in the present specification are for explaining the embodiments rather than limiting the present disclosure. Unless explicitly described to the contrary, a singular form includes a plural form in the present specification. Components, steps, operations, and/or elements mentioned by terms "comprise" and/or "comprising" used in the present disclosure do not exclude the existence or addition of one or more other components, steps, operations, and/or elements.

Hereinabove, the present disclosure has been described with reference to embodiments. All embodiments and conditional illustrations disclosed in the present disclosure have been described to intend to assist in the understanding of the principle and the concept of the present disclosure by those skilled in the art to which the present disclosure pertains. Therefore, it will be understood by those skilled in the art to which the present disclosure pertains that the present disclosure may be implemented in modified forms without departing from the spirit and scope of the present disclosure.

Therefore, embodiments disclosed herein should be considered in an illustrative aspect rather than a restrictive aspect. The scope of the present disclosure should be defined by the claims rather than the above-mentioned description, and equivalents to the claims should be interpreted to fall within the present disclosure.

Meanwhile, the vehicle-to-vehicle distance measuring method according to various embodiments of the present disclosure described above may be implemented as programs and be provided to servers or devices. Therefore, the respective apparatuses may access the servers or the devices in which the programs are stored to download the programs.

In addition, the control method according to various embodiments of the present disclosure described above may be implemented as programs and be provided in a state in which it is stored in various non-transitory computer-readable media. The non-transitory computer-readable medium is not a medium that stores data therein for a while, such as a register, a cache, a memory, or the like, but means a medium that semi-permanently stores data therein and is readable by an apparatus. In detail, various applications or programs described above may be stored and provided in the non-transitory computer-readable medium such as a compact disk (CD), a digital versatile disk (DVD), a hard disk, a Blu-ray disk, a universal serial bus (USB), a memory card, a read only memory (ROM), or the like.

Although the preferred embodiments of the present disclosure have been illustrated and described above, the present disclosure is not limited to the specific embodiments described above, and can be variously modified by those skilled in the art to which the present disclosure pertains without departing from the gist of the present disclosure claimed in the claims, and these modifications should not be understood individually from the technical ideas or prospects of the present disclosure.

What is claimed is:

1. A location measurement method comprising:
   acquiring a surrounding image photographed by an electronic device having a processor and a memory;
   acquiring first location information of the electronic device using a global navigation satellite system;
   extracting a plurality of feature points from objects within the surrounding image;
   detecting a static object from the plurality of feature points and matching the static object to feature points of a pre-stored real-world image map;
   determining location information of the static object based on pre-stored data; and
   acquiring second location information by correcting the first location information according to a correction value calculated using the location information of the static object,
   wherein the acquiring the second location information comprises:
   transmitting the surrounding image and the first location information to an image analysis server;
   detecting, by the image analysis server, a real-world image map matching the first location information;
   comparing the real-world image map with the surrounding image to detect a detected image including the static object corresponding to the surrounding image from the real-world image map;
   calculating a difference in viewing angles between the detected image and the surrounding image and a difference between the location information matching the detected image and the first location information to calculate the correction value for a correction of the first location information; and
   calculating the second location information based on the correction value.

2. The location measurement method of claim 1,
   wherein the surrounding image includes a front image photographed by a first camera and a rear image photographed by a second camera,
   wherein the method further comprises generating a combined image in which the front image and the rear image are combined in consideration of an angle of view of the first and the second cameras, and
   wherein the second location information is obtained by correcting the first location information using the combined image.

3. The location measurement method of claim 1, further comprising:
   generating a static object image excluding dynamic objects from the surrounding image,
   wherein the second location information is obtained by correcting the first location information using the static object image.

4. The location measurement method of claim 1, further comprising:
   determining whether the second location information is a location within an area where a moving object is movable.

5. The location measurement method of claim 4, further comprising:
   acquiring third location information obtained by correcting the second location information to a third location within a movable area when the second location information does not correspond to a location within the area where the moving object is permitted to move.

6. The location measurement method of claim 5, further comprising:
   determining the second location information as the location of the moving object when the second location information corresponds to the location within the area where the moving object is permitted to move.

7. The location measurement method of claim 5, wherein the third location information is acquired by laterally shifting the second location information to be matched within the movable area.

8. The location measurement method of claim 6, wherein the determining includes determining a type of the moving object and determining the movable area according to the determined type of the moving object.

9. The location measurement method of claim 6, further comprising:
   generating fourth location information by correcting the second location information or the third location information based on a magnitude value of a change in an optical axis direction and a changed direction value, when the change in the optical axis direction to which an optical axis of a camera is directed is detected while the moving object is moving.

10. A location measurement apparatus, comprising:
    an image acquisition unit that acquires a surrounding image photographed by an electronic device having a processor and a memory;
    a first location information acquisition unit that acquires first location information of the electronic device using a global navigation satellite system;
    a second location information acquisition unit that is configured to extract a plurality of feature points from objects within the surrounding image; to detect a static object from the plurality of feature points and to match the static object to feature points of a pre-stored real-world image map; to determine location information of the static object based on pre-stored data; and to acquire second location information by correcting the first location information according to a correction value calculated using the location information of the static object; and
    a communication unit that transmits the surrounding image and the first location information to an image analysis server,
    wherein the image analysis server detects a real-world image map matching the first location information, compares the real-world image map with the surrounding image to detect a detected image including the static object corresponding to the surrounding image from the real-world image map, calculates a difference in viewing angles between the detected image and the surrounding image and a difference between the location information matching the detected image and the first location information to calculate the correction value for a correction of the first location information, and calculates the second location information based on the correction value.

11. The location measurement apparatus of claim 10,
wherein the acquired surrounding image includes a front image photographed by a first camera and a rear image photographed by a second camera,
wherein the location measurement apparatus further comprises an image processing unit that combines the front image and the rear image in consideration of an angle of view of the first and the second cameras, and
wherein the second location information acquisition unit acquires the second location information obtained by correcting the first location information using the combined image.

12. The location measurement apparatus of claim 10, further comprising:
an image processing unit that generates a static object image excluding dynamic objects from the surrounding image,
wherein the second location information acquisition unit acquires the second location information obtained by correcting the first location information using the static object image.

13. The location measurement apparatus of claim 10, further comprising:
a third location information acquisition unit that determines whether the second location information is a location within an area where a moving object is movable.

14. The location measurement apparatus of claim 13, wherein the third location information acquisition unit acquires third location information obtained by correcting the second location information to a third location within a movable area when the second location information does not correspond to a location within the area where the moving object is permitted to move.

15. The location measurement apparatus of claim 14, wherein the third location information acquisition unit determines the second location information as the location of the moving object when the second location information corresponds to the location within the area where the moving object is permitted to move.

16. The location measurement apparatus of claim 15, wherein the third location information acquisition unit acquires the third location information by laterally shifting the second location information to be matched within the movable area.

17. The location measurement apparatus of claim 15, further comprising:
a fourth location information acquisition unit that generates fourth location information by correcting the second location information or the third location information based on a magnitude value of a change in a optical axis direction and the changed direction value, when the change in the optical axis direction to which the optical axis of a camera is directed is detected while the moving object is moving.

18. A non-transitory computer readable storage medium containing instructions, that when executed by one or more processors, cause the one or more processor to perform a method, the method comprising:
acquiring a surrounding image photographed by an electronic device having a processor and a memory;
acquiring first location information of the electronic device using a global navigation satellite system;
extracting a plurality of feature points from objects within the surrounding image;
detecting a static object from the plurality of feature points and matching the static object to feature points of a pre-stored real-world image map;
determining location information of the static object based on pre-stored data; and
acquiring second location information by correcting the first location information according to a correction value calculated using the location information of the static object,
wherein the acquiring the second location information comprises:
transmitting the surrounding image and the first location information to an image analysis server;
detecting, by the image analysis server, a real-world image map matching the first location information;
comparing the real-world image map with the surrounding image to detect a detected image including the static object corresponding to the surrounding image from the real-world image map;
calculating a difference in viewing angles between the detected image and the surrounding image and a difference between the location information matching the detected image and the first location information to calculate the correction value for a correction of the first location information; and
calculating the second location information based on the correction value.

* * * * *